United States Patent
Wilder et al.

(10) Patent No.: US 7,857,700 B2
(45) Date of Patent: Dec. 28, 2010

(54) THREE-DIMENSIONAL AUTOSTEREOSCOPIC IMAGE DISPLAY FOR A GAMING APPARATUS

(75) Inventors: Richard L. Wilder, Sparks, NV (US); Harold E. Mattice, Gardnerville, NV (US); Chauncey W. Griswold, Reno, NV (US)

(73) Assignee: IGT, Reno, NV (US)

( * ) Notice: Subject to any disclaimer, the term of this patent is extended or adjusted under 35 U.S.C. 154(b) by 1091 days.

(21) Appl. No.: 10/661,983

(22) Filed: Sep. 12, 2003

(65) Prior Publication Data

US 2005/0059487 A1 Mar. 17, 2005

(51) Int. Cl.
*A63F 13/00* (2006.01)
*H04N 13/04* (2006.01)
*H04N 9/47* (2006.01)

(52) U.S. Cl. .................. 463/33; 345/419; 348/51; 348/59; 359/463

(58) Field of Classification Search ......... 463/12–13, 463/30–33, 34, 42, 16–20, 1; 348/14.16, 348/40, 42, 51, 54, 59; 359/23, 35, 362, 359/373, 376, 460, 458, 462, 463, 466; 345/418–419
See application file for complete search history.

(56) References Cited

U.S. PATENT DOCUMENTS

| | | | |
|---|---|---|---|
| 3,409,351 A | 11/1968 | Winnek | 353/7 |
| 3,708,219 A | 1/1973 | Forlini et al. | |
| 4,101,210 A * | 7/1978 | Lo et al. | 353/7 |
| 4,333,715 A | 6/1982 | Brooks | |
| 4,607,844 A | 8/1986 | Fullerton | |
| 4,659,182 A | 4/1987 | Aizawa | |
| 4,718,672 A | 1/1988 | Okada | |
| 4,911,449 A | 3/1990 | Dickinson et al. | |
| 4,912,548 A | 3/1990 | Shanker et al. | |
| 4,922,336 A | 5/1990 | Morton | |
| 5,086,354 A | 2/1992 | Bass et al. | |

(Continued)

FOREIGN PATENT DOCUMENTS

EP 0 454 423 10/1991

(Continued)

OTHER PUBLICATIONS

Cees van Berkel and John A. Clarke, "Characterisation and Optimisation of 3D-LCD Module Design", Feb. 11-14, 1997, SPIE International Conference on Electronic Imaging.*

(Continued)

*Primary Examiner*—David L Lewis
*Assistant Examiner*—Milap Shah
(74) *Attorney, Agent, or Firm*—Weaver Austin Villeneuve & Sampson LLP

(57) ABSTRACT

A gaming apparatus may include a display unit capable of displaying three-dimensional images, a value input device, and a controller operatively coupled to the display unit and the value input device. The display unit may include a display screen which may have a plurality of display pixels and a lenticular screen coupled with the display screen. The three-dimensional display may include a first perspective view of the image when the image is viewed from a first angle and a second perspective view of the image when the image is viewed from a second angle, the first and second perspective views being displayed simultaneously.

52 Claims, 18 Drawing Sheets

U.S. PATENT DOCUMENTS

| | | | |
|---|---|---|---|
| 5,113,272 A | 5/1992 | Reamey | |
| 5,152,529 A | 10/1992 | Okada | |
| 5,162,787 A | 11/1992 | Thompson et al. | |
| 5,317,348 A | 5/1994 | Knize | |
| 5,342,047 A | 8/1994 | Heidel et al. | |
| 5,364,100 A | 11/1994 | Ludlow et al. | |
| 5,375,830 A | 12/1994 | Takemoto et al. | |
| 5,376,587 A | 12/1994 | Buchmann et al. | |
| 5,393,061 A | 2/1995 | Manship et al. | |
| 5,395,111 A | 3/1995 | Inoue | |
| 5,467,893 A | 11/1995 | Landis, II et al. | |
| 5,539,547 A | 7/1996 | Ishii et al. | |
| 5,580,055 A | 12/1996 | Hagiwara et al. | 273/143 |
| 5,585,821 A | 12/1996 | Ishikura et al. | |
| 5,589,980 A | 12/1996 | Bass et al. | |
| 5,655,961 A * | 8/1997 | Acres et al. | 463/27 |
| 5,752,881 A | 5/1998 | Inoue | |
| 5,762,413 A | 6/1998 | Colucci et al. | |
| 5,764,317 A | 6/1998 | Sadovnik et al. | |
| 5,801,763 A | 9/1998 | Suzuki | |
| 5,838,494 A * | 11/1998 | Araki | 359/455 |
| 5,844,716 A | 12/1998 | Anderson | |
| 5,850,225 A | 12/1998 | Cosman | |
| 5,910,046 A | 6/1999 | Wada et al. | |
| 5,923,469 A | 7/1999 | Machtig et al. | |
| 5,951,397 A | 9/1999 | Dickinson | |
| 5,956,180 A | 9/1999 | Bass et al. | |
| 5,967,893 A | 10/1999 | Lawrence et al. | |
| 5,993,027 A | 11/1999 | Yamamoto | |
| 6,001,016 A | 12/1999 | Walker et al. | |
| 6,008,784 A | 12/1999 | Acres et al. | |
| 6,015,346 A | 1/2000 | Bennett | |
| 6,059,658 A | 5/2000 | Mangano et al. | |
| 6,072,545 A | 6/2000 | Gribschaw et al. | |
| 6,086,066 A | 7/2000 | Takeuchi et al. | |
| 6,104,405 A | 8/2000 | Idaszak et al. | |
| 6,115,006 A | 9/2000 | Brotz | |
| 6,120,461 A | 9/2000 | Smyth | |
| 6,135,884 A | 10/2000 | Hedrick et al. | |
| 6,139,432 A | 10/2000 | Watanabe et al. | |
| 6,159,098 A | 12/2000 | Slomiany et al. | |
| D436,469 S | 1/2001 | Idaszak et al. | |
| 6,177,913 B1 | 1/2001 | Whitesell | |
| 6,204,832 B1 | 3/2001 | Melville et al. | |
| 6,208,318 B1 | 3/2001 | Anderson et al. | |
| 6,208,389 B1 * | 3/2001 | Aben et al. | 348/824 |
| D440,794 S | 4/2001 | Zobel, Jr. et al. | |
| 6,213,875 B1 | 4/2001 | Suzuki | |
| 6,231,189 B1 | 5/2001 | Colucci et al. | |
| 6,234,900 B1 | 5/2001 | Cumbers | |
| 6,244,596 B1 | 6/2001 | Kondratjuk | |
| 6,251,014 B1 | 6/2001 | Stockdale et al. | |
| 6,252,707 B1 | 6/2001 | Kleinberger et al. | |
| 6,254,481 B1 | 7/2001 | Jaffe | |
| 6,315,666 B1 | 11/2001 | Mastera et al. | |
| 6,322,445 B1 | 11/2001 | Miller | |
| 6,337,513 B1 | 1/2002 | Clevenger et al. | |
| 6,347,996 B1 | 2/2002 | Gilmore et al. | |
| 6,368,216 B1 | 4/2002 | Hedrick et al. | |
| 6,379,244 B1 | 4/2002 | Sagawa et al. | |
| 6,398,220 B1 | 6/2002 | Inoue | |
| 6,404,409 B1 | 6/2002 | Solomon | |
| 6,416,827 B1 | 7/2002 | Chakrapani et al. | |
| 6,444,496 B1 | 9/2002 | Edwards et al. | |
| 6,456,262 B1 | 9/2002 | Bell | |
| 6,491,583 B1 | 12/2002 | Gauselmann | |
| 6,503,147 B1 | 1/2003 | Stockdale et al. | |
| 6,511,375 B1 | 1/2003 | Kaminkow | |
| 6,512,559 B1 | 1/2003 | Hashimoto et al. | |
| 6,514,141 B2 | 2/2003 | Kaminkow et al. | |
| 6,517,432 B1 | 2/2003 | Jaffe | |
| 6,517,433 B2 * | 2/2003 | Loose et al. | 463/20 |
| 6,530,667 B1 | 3/2003 | Idaszak et al. | |
| 6,547,664 B2 | 4/2003 | Saunders | |
| 6,559,840 B1 | 5/2003 | Lee | |
| 6,569,018 B2 | 5/2003 | Jaffe | |
| 6,572,204 B1 | 6/2003 | Hedrick et al. | |
| 6,573,894 B1 | 6/2003 | Idaszak et al. | |
| 6,574,047 B2 * | 6/2003 | Hawver | 359/626 |
| 6,575,541 B1 | 6/2003 | Hedrick et al. | |
| 6,585,591 B1 | 7/2003 | Baerlocher et al. | |
| 6,612,927 B1 | 9/2003 | Slomiany | |
| D480,961 S | 10/2003 | Deadman | |
| 6,646,695 B1 | 11/2003 | Gauselmann | |
| 6,652,378 B2 | 11/2003 | Cannon et al. | |
| 6,659,864 B2 | 12/2003 | McGahn et al. | |
| 6,661,425 B1 | 12/2003 | Hiroaki | |
| 6,669,346 B2 | 12/2003 | Metcalf | |
| 6,695,703 B1 | 2/2004 | McGahn | |
| 6,702,675 B2 | 3/2004 | Poole et al. | |
| 6,712,694 B1 | 3/2004 | Nordman | |
| 6,715,756 B2 | 4/2004 | Inoue | |
| 6,717,728 B2 | 4/2004 | Putilin | |
| 6,722,979 B2 | 4/2004 | Gilmore et al. | |
| 6,753,847 B2 | 6/2004 | Kurtenbach et al. | |
| 6,755,737 B2 | 6/2004 | Jackson et al. | |
| 6,802,777 B2 | 10/2004 | Seelig et al. | |
| 6,817,945 B2 | 11/2004 | Seelig et al. | |
| 6,817,946 B2 | 11/2004 | Motegi et al. | |
| 6,832,956 B1 | 12/2004 | Boyd et al. | |
| 6,857,958 B2 | 2/2005 | Osawa | |
| 6,866,585 B2 | 3/2005 | Muir | |
| 6,887,157 B2 | 5/2005 | LeMay et al. | |
| 6,890,259 B2 | 5/2005 | Breckner et al. | |
| 6,893,344 B2 | 5/2005 | Brown et al. | |
| 6,906,762 B1 | 6/2005 | Witehira et al. | |
| 6,937,298 B2 | 8/2005 | Okada | |
| 6,939,226 B1 | 9/2005 | Joshi | |
| 6,954,223 B2 * | 10/2005 | Miyazawa et al. | 348/51 |
| 7,095,180 B2 | 8/2006 | Emslie et al. | |
| 7,097,560 B2 | 8/2006 | Okada | |
| 7,159,865 B2 | 1/2007 | Okada | |
| 7,160,187 B2 | 1/2007 | Loose et al. | |
| 7,207,883 B2 | 4/2007 | Nozaki et al. | |
| 7,220,181 B2 | 5/2007 | Okada | |
| 7,252,288 B2 | 8/2007 | Seelig et al. | |
| 7,255,643 B2 | 8/2007 | Ozaki et al. | |
| 7,297,058 B2 * | 11/2007 | Gomez et al. | 463/16 |
| 7,309,284 B2 | 12/2007 | Griswold et al. | |
| 7,322,884 B2 | 1/2008 | Emori et al. | |
| 7,329,181 B2 | 2/2008 | Hoshino et al. | |
| 7,439,683 B2 | 10/2008 | Emslie | |
| 7,505,049 B2 | 3/2009 | Engel | |
| 7,619,585 B2 | 11/2009 | Bell et al. | |
| 7,624,339 B1 | 11/2009 | Engel et al. | |
| 7,626,594 B1 | 12/2009 | Witehira et al. | |
| 7,724,208 B1 | 5/2010 | Engel et al. | |
| 2001/0015753 A1 | 8/2001 | Myers | 348/51 |
| 2001/0040671 A1 | 11/2001 | Metcalf | |
| 2001/0048507 A1 * | 12/2001 | Thomas et al. | 353/10 |
| 2002/0008676 A1 | 1/2002 | Miyazaki et al. | |
| 2002/0011969 A1 | 1/2002 | Lipton et al. | 345/8 |
| 2002/0036825 A1 | 3/2002 | Lipton et al. | 359/463 |
| 2002/0067467 A1 | 6/2002 | Dorval | |
| 2002/0140631 A1 | 10/2002 | Blundell | |
| 2002/0167637 A1 | 11/2002 | Burke | |
| 2002/0173354 A1 | 11/2002 | Winans et al. | |
| 2003/0011535 A1 | 1/2003 | Kikuchi et al. | |
| 2003/0027624 A1 | 2/2003 | Gilmore et al. | |
| 2003/0052876 A1 | 3/2003 | Lee et al. | 345/419 |
| 2003/0060268 A1 * | 3/2003 | Falconer | 463/20 |
| 2003/0064781 A1 | 4/2003 | Muir | |
| 2003/0087690 A1 | 5/2003 | Loose et al. | |
| 2003/0128427 A1 | 7/2003 | Kalmanash | |

| | | |
|---|---|---|
| 2003/0130028 A1 | 7/2003 | Aida et al. |
| 2003/0166417 A1 | 9/2003 | Moriyama et al. |
| 2003/0176214 A1* | 9/2003 | Burak et al. ............ 463/20 |
| 2003/0236118 A1 | 12/2003 | Okada |
| 2004/0029636 A1 | 2/2004 | Wells et al. |
| 2004/0063490 A1 | 4/2004 | Okada |
| 2004/0066475 A1 | 4/2004 | Searle |
| 2004/0077401 A1 | 4/2004 | Schlottmann et al. |
| 2004/0102245 A1 | 5/2004 | Escalera et al. |
| 2004/0116178 A1 | 6/2004 | Okada |
| 2004/0130501 A1 | 7/2004 | Kondo et al. |
| 2004/0147303 A1 | 7/2004 | Imura et al. |
| 2004/0150162 A1 | 8/2004 | Okada |
| 2004/0162146 A1 | 8/2004 | Ooto |
| 2004/0166925 A1 | 8/2004 | Emori et al. |
| 2004/0171423 A1 | 9/2004 | Silva et al. |
| 2004/0183972 A1 | 9/2004 | Bell |
| 2004/0192430 A1* | 9/2004 | Burak et al. ............ 463/20 |
| 2004/0198485 A1 | 10/2004 | Loose et al. |
| 2004/0207154 A1 | 10/2004 | Okada |
| 2004/0209666 A1 | 10/2004 | Tashiro et al. |
| 2004/0209667 A1 | 10/2004 | Emori et al. |
| 2004/0209668 A1 | 10/2004 | Okada |
| 2004/0209671 A1 | 10/2004 | Okada |
| 2004/0209678 A1 | 10/2004 | Okada |
| 2004/0209683 A1 | 10/2004 | Okada |
| 2004/0214635 A1 | 10/2004 | Okada |
| 2004/0214637 A1 | 10/2004 | Nonaka |
| 2004/0224747 A1 | 11/2004 | Okada |
| 2004/0233663 A1 | 11/2004 | Emslie et al. |
| 2004/0239582 A1 | 12/2004 | Seymour |
| 2004/0266536 A1 | 12/2004 | Mattice et al. |
| 2005/0017924 A1 | 1/2005 | Utt et al. |
| 2005/0032571 A1 | 2/2005 | Asonuma |
| 2005/0037843 A1 | 2/2005 | Wells et al. |
| 2005/0049032 A1 | 3/2005 | Kobayashi |
| 2005/0049046 A1 | 3/2005 | Kobayashi |
| 2005/0062410 A1 | 3/2005 | Bell |
| 2005/0062684 A1 | 3/2005 | Geng |
| 2005/0063055 A1 | 3/2005 | Engel |
| 2005/0079913 A1 | 4/2005 | Inamura |
| 2005/0085292 A1 | 4/2005 | Inamura |
| 2005/0192090 A1 | 9/2005 | Muir et al. |
| 2005/0206582 A1 | 9/2005 | Bell et al. |
| 2005/0239539 A1 | 10/2005 | Inamura |
| 2005/0266912 A1 | 12/2005 | Sekiguchi |
| 2005/0285337 A1 | 12/2005 | Durham et al. |
| 2006/0063594 A1 | 3/2006 | Benbrahim |
| 2006/0103951 A1 | 5/2006 | Bell |
| 2006/0125745 A1 | 6/2006 | Evanicky |
| 2006/0191177 A1 | 8/2006 | Engel |
| 2006/0284574 A1 | 12/2006 | Emslie et al. |
| 2006/0290594 A1 | 12/2006 | Engel |
| 2007/0004513 A1 | 1/2007 | Wells et al. |
| 2007/0026935 A1 | 2/2007 | Wolf et al. |
| 2007/0026942 A1 | 2/2007 | Kinsley et al. |
| 2007/0060390 A1 | 3/2007 | Wells |
| 2007/0072665 A1 | 3/2007 | Muir |
| 2007/0077986 A1 | 4/2007 | Loose |
| 2007/0252804 A1 | 11/2007 | Engel |
| 2009/0104989 A1 | 4/2009 | Williams et al. |
| 2010/0045601 A1 | 2/2010 | Engel |
| 2010/0115391 A1 | 5/2010 | Engel |
| 2010/0115439 A1 | 5/2010 | Engel |

FOREIGN PATENT DOCUMENTS

| | | |
|---|---|---|
| EP | 0 484 103 | 5/1992 |
| EP | 0 997 857 | 10/1999 |
| EP | 1 063 622 | 12/2000 |
| EP | 1 260 928 | 11/2002 |
| EP | 1 282 088 | 2/2003 |
| EP | 1 462 152 | 9/2004 |
| EP | 1465126 | 10/2004 |
| GB | 1 464 896 | 2/1977 |
| JP | 2004-220276 | 8/1992 |
| JP | 2006-043425 | 2/1994 |
| JP | 2007-124290 | 5/1995 |
| JP | 2000-300729 | 10/2000 |
| JP | 2000-350805 | 12/2000 |
| JP | 2001-062032 | 3/2001 |
| JP | 2001-238995 | 9/2001 |
| JP | 2001-252393 | 9/2001 |
| JP | 2001-252394 | 9/2001 |
| JP | 2002-085624 | 3/2002 |
| JP | 2004-089707 | 3/2004 |
| JP | 2004-105616 | 4/2004 |
| JP | 2004-166879 | 6/2004 |
| JP | 2005-253561 | 9/2005 |
| JP | 2005-266387 | 9/2005 |
| JP | 2005-266388 | 9/2005 |
| JP | 2005-274906 | 10/2005 |
| JP | 2005-274907 | 10/2005 |
| JP | 2005-283864 | 10/2005 |
| JP | 2006-059607 | 3/2006 |
| JP | 2006-346226 | 12/2006 |
| JP | 2007-200869 | 8/2007 |
| WO | WO93-13446 | 7/1993 |
| WO | WO99-42889 | 8/1999 |
| WO | WO99-44095 | 9/1999 |
| WO | WO01-09664 | 2/2001 |
| WO | WO 01/15127 | 3/2001 |
| WO | WO 01/15128 | 3/2001 |
| WO | WO01-15132 | 3/2001 |
| WO | WO01-38926 | 5/2001 |
| WO | WO01/51980 | 7/2001 |
| WO | WO01/76260 | 10/2001 |
| WO | WO 02/32521 * | 4/2002 |
| WO | WO02/065192 | 8/2002 |
| WO | WO02-084637 | 10/2002 |
| WO | WO02-086610 | 10/2002 |
| WO | WO02-089102 | 11/2002 |
| WO | WO03-001486 | 1/2003 |
| WO | WO03-023491 | 3/2003 |
| WO | WO03-032058 | 4/2003 |
| WO | WO 03/039699 | 5/2003 |
| WO | WO03-040820 | 5/2003 |
| WO | WO03-079094 | 10/2003 |
| WO | WO2004-001486 | 12/2003 |
| WO | WO2004-001488 | 12/2003 |
| WO | WO2004-002143 | 12/2003 |
| WO | WO2004-008226 | 1/2004 |
| WO | WO2004-023825 | 3/2004 |
| WO | WO2004-036286 | 4/2004 |
| WO | WO2004-102520 | 11/2004 |
| WO | WO 2005/016473 | 2/2005 |
| WO | WO 2005/034054 | 4/2005 |
| WO | WO 2006/034192 | 3/2006 |
| WO | WO 2006/038819 | 4/2006 |
| WO | WO2006-112740 | 10/2006 |
| WO | WO2007-040413 | 4/2007 |
| WO | WO2010-023537 | 3/2010 |

OTHER PUBLICATIONS

Cees van Berkel, A R Franklin and J R Mansell, "Design and Applications of Multiview 3D-LCD", Oct. 1996, 1996 EuroDisplay Conference, pp. 109-112.*
Cees van Berkel and John A Clarke. "Characterization & Optimization of 3D-LCD Module Design" Feb. 11-14, 1997, SPIE International Conference on Electronic Imaging.*
Cees van Berkel, "Image Preparation for 3D-LCD" Dated: Jan. 25, 1999 SPIE Conference on Stereoscopic Displays.*
"The SynthaGram Handbook", SteroGraphics, 13 pages, Feb. 2003.

"SynthaGram Monitor", SteroGraphics Corporation, website, 5 pages, © 2003. http://www.sterographics.com/products/synthagram/synthagram.htm.
International Search Report and Written Opinion Of The International Searching Authority dated Nov. 2, 2005, for related PCT Application No. PCT/US2004/028184.
US Office Action dated Sep. 4, 2008 issued in U.S. Appl. No. 11/225,966.
US Office Action Final dated May 27, 2009 issued in U.S. Appl. No. 11/225,966.
US Office Action dated Nov. 24, 2009 issued in U.S. Appl. No. 11/225,966.
US Office Action (Examiner Interview Summary) dated Feb. 9, 2010 issued in U.S. Appl. No. 11/225,966.
US Office Action dated May 23, 2007 issued in U.S. Appl. No. 10/638,578.
US Office Action dated Dec. 4, 2007 issued in U.S. Appl. No. 10/638,578.
US Office Action Final dated Apr. 17, 2008 issued in U.S. Appl. No. 10/638,578.
US Office Action dated Sep. 30, 2008 issued in U.S. Appl. No. 10/638,578.
US Office Action dated Jun. 24, 2009 issued in U.S. Appl. No. 10/638,578.
PCT International Search Report dated Feb. 11, 2005 issued in PCT/US2004/028184 (W02005/034054).
PCT International Preliminary Report on Patentability and Written Opinion dated Mar. 13, 2006 issued in PCT/US2004/028184 (W02005/034054).
AU Examiner's First Report issued for AU 2004279008 dated Nov. 28, 2008.
PCT International Search Report dated Feb. 22, 2005 issued in PCT/US2004/025132 (W02005/016473).
PCT International Preliminary Report on Patentability and Written Opinion dated Feb. 13, 2006 issued in PCT/US2004/025132 (W02005/016473).
GB Examination Report dated Dec. 19, 2006 issued in GB 0602813.8.
GB Examination Report dated Oct. 22, 2007 issued in GB 0602813.8.
GB Examination Report dated Jan. 7, 2008 issued in GB 0602813.8.
GB Supplementary Examination Report dated Apr. 11, 2008 issued in GB 060813.8.
GB Decision on Hearing dated May 23, 2008 issued in GB 060813.8.
Bcbis et al., (2000) "An Eigenspace Approach to Eye-Gaze Estimation," ISCA 13$^{TH}$ International Conference on Parallel and Distributed Computing Systems (Special Session on Digital Video and Digital Audio), Las Vegas, 604-609, 6 pages.
"Elumens: Vision Series Products' Specifications", Webpage document, 25 pages, ©2000-2001, found at: http://www.elumens.com/technology/downloadable/VisionSeries_Whitepaper31.doc.
"Elumens: 3D Digital Content Creation for the Vision Series", Webpage document, 21 pages, ©2000-2001, found at http://www.elumens.com/technology/downloadable/3D_Digital_Content Creation.pdf.
"Elumens Technology", Webpage document, 2 pages, ©2001, found at: http//www.elumens.com/technology/technology.html.
"Elumens/Hardware/Tru Theta", Webpage document, 2 pages, ©2001, found at: http//www.elumens.com/technology/hardware.html.
"Elumens/Software", Webpage document, 1 page, ©2001, found at: http://clumcns.com/tcchnology/softwarc.html.
http://www.seeingmachines.com/facelab. htm website, version 4.2, Sep. 12, 2005, 6 pages.
Ji et al., "An Non-invasive Multi-sensory Technique for Monitoring Human Fatigue", Computer Vision and Robotics Laboratory, Department of Computer Science, University of Nevada, slide presentation, available on Internet Sep. 12, 2005, 43 pages.
Lewis (May 2004) "In the Eye of the Beholder", *IEEE Spectrum*, 24-28.
Tcschlcr, Lcland, "'Awcsomc!': Dish-Display System Dazzlcs CAD Uscrs," Machinc Dcsign, ©2000.
"VisionStation", Webpage doument, 3 pages, ©2000, found at http://www.elumens.com/products/visionstation.html.
"VisionStation (technical specifications)", Webpage doument, 4 pages, ©2000, found at http://www.elumens.com/products/vstechspecs.html.
Woo, Mason et al., "OpenGL® Programming Guide", 3rd Ed., v.1.2, ©1999, pp. 1-25, 93-154 and 663-668.
U.S. Appl. No. 09/622,409, filed Nov. 6, 2000, Engel, Gabriel.
U.S. Appl. No. 10/048,966, filed Feb. 6, 2002, Engel, Gabriel.
US Office Action (Examiner Interview Summary) dated May 3, 2010 issued in U.S. Appl. No. 11/225,966.
US Notice of Allowance dated May 3, 2010 issued in U.S. Appl. No. 11/225,966.
US Office Action dated May 28, 2010 issued in U.S. Appl. No. 10/638,578.
US Office Action (Examiner Interview Summary) dated Jun. 3, 2010 issued in U.S. Appl. No. 10/638,578.
Debut of the Let's Make a Deal Slot Machine (2002), vvvvw.letsmakeadeal.com, 1999-2002, downloaded from Internet on Dec. 3, 2002 at http://www.letsmakeadeal.com/pr01.htm, 2 pgs.
Games: Super Monkey Ball, Nintendo of America Inc., 2007, http://www.nintendo.com/gamemini?gamcid=m-Game-0000-617 (1 page).
Light Valve (2005), www.meko.co.uk, retrieved from the Internet on Nov. 15, 2005 at http://www.meko.co.uk/lightvalve.shtml, 1 page.
Liquid Crystal Display (2005), Wikipedia.org, retrieved from the Internet on Nov. 16, 2005 at http://en.wikipedia.org/wiki/LCD, 6 pgs.
Magnetica: The Official Website from Nintendo of America, 2006, http://magnetica.intendods.com/launch/ (1 page).
SPD (1999), *Malvino Inc.*, retrieved from the Internet on Jul. 19, 1999 at http://www.malvino.com, 10 pgs.
What is SPD? (2002), www.SPD Systems, Inc., retrieved from the Internet on Dec. 4, 2002 at http://www.spd-systems.com/spdq.htm, 2 pgs.
Bonsor, Kevin (2002), "How Smart Windows Will Work," *Hovvstuffvvorks, Inc*. 1998-2002, retrieved from the Internet on Nov. 25, 2002 at http://www/howstuffworks.com/smart-window.htm/printable, 5 pgs.
Bosner, Kevin (2004) "How Smart Windows Work," *HowStuffWorks, Inc*., 1998-2004, retrieved from the Internet on Apr. 1, 2004 at http://www.howstuffworks.com, 9 pgs.
Living in a flat world? Advertisement written by Deep Video Imaging Ltd., published 2000.
Novel 3-D Video Display Technology Developed, News release: Aug. 30, 1996, www.eturekalert.org/summaries/1199.html, printed from Internet Archive using date Sep. 2, 2000.
Saxe et al., "Suspended-Particle Devices," www.refr-spd.com, retrieved from the Internet on Apr. 1, 2004 at http://www.refr-spd.com, Apr./May 1996, 5 pgs.
"The SynthaGram Handbook", SteroGraphics, 12 pages, Feb. 2003.
Time Multiplexed Optical Shutter (TMOS): A revolutionary Flat Screen Display Technology, www.vea.com/TMOS.html, Apr. 8, 1999, printed from Internet Archive using date Oct. 6, 1999.
Time Multiplexed Optical Shutter (TMOS): A revolutionary Flat Screen Display Technology, www.tralas.com/TMOS.html, Apr. 5, 2001, printed from Internet Archive using date Apr. 11, 2001.
Police 911, retrieved from Wikipedia.org, 2001, on Oct. 28, 2007 at http://en.wikipedia.org/wiki/Police_911.

* cited by examiner

FIG. 10
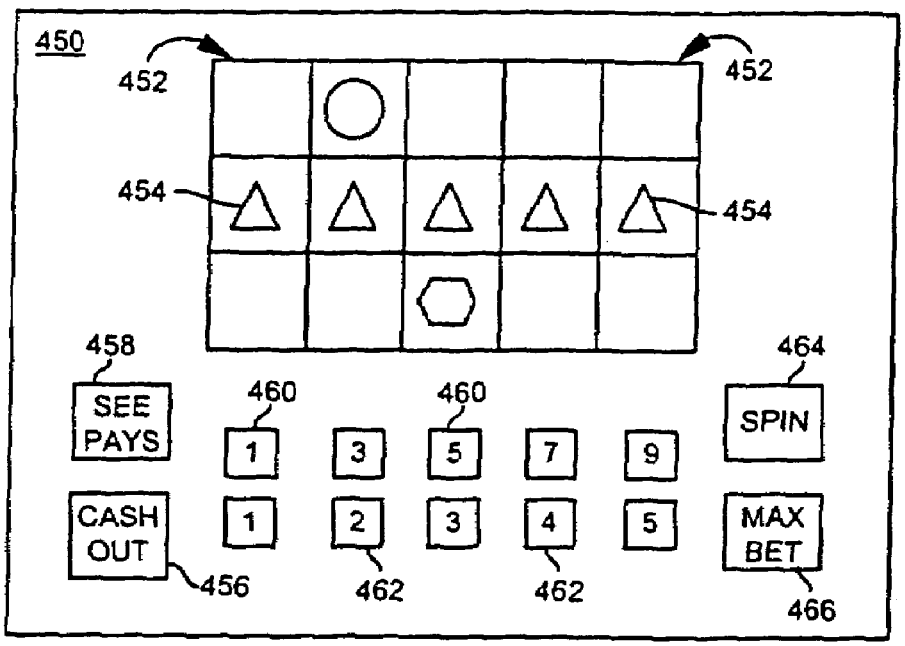
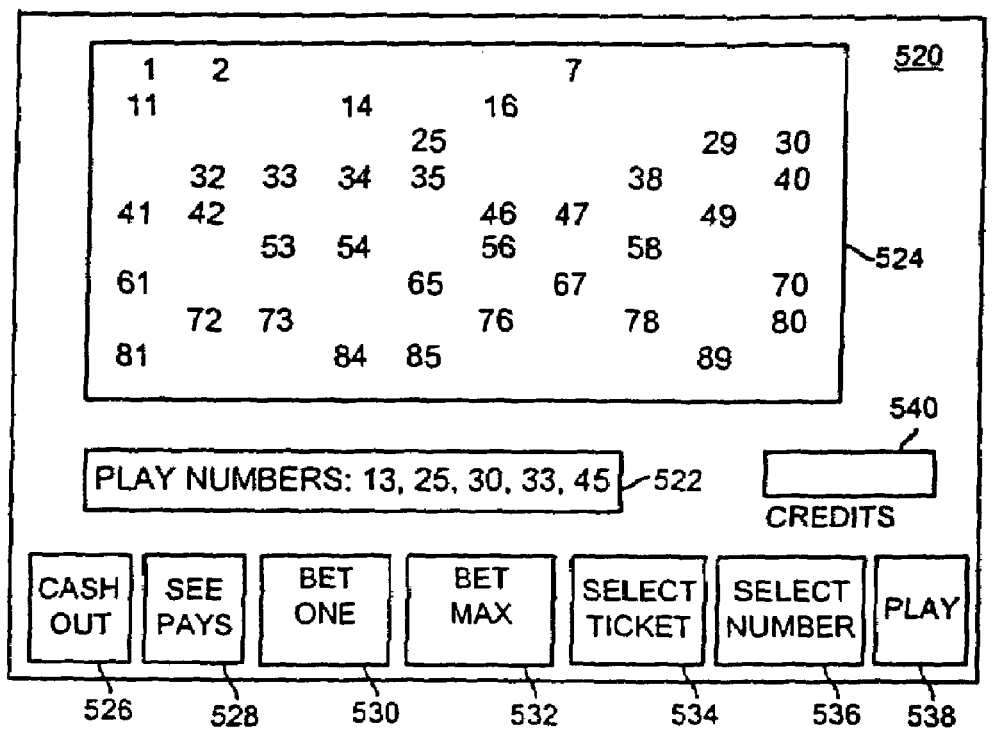
FIG. 11

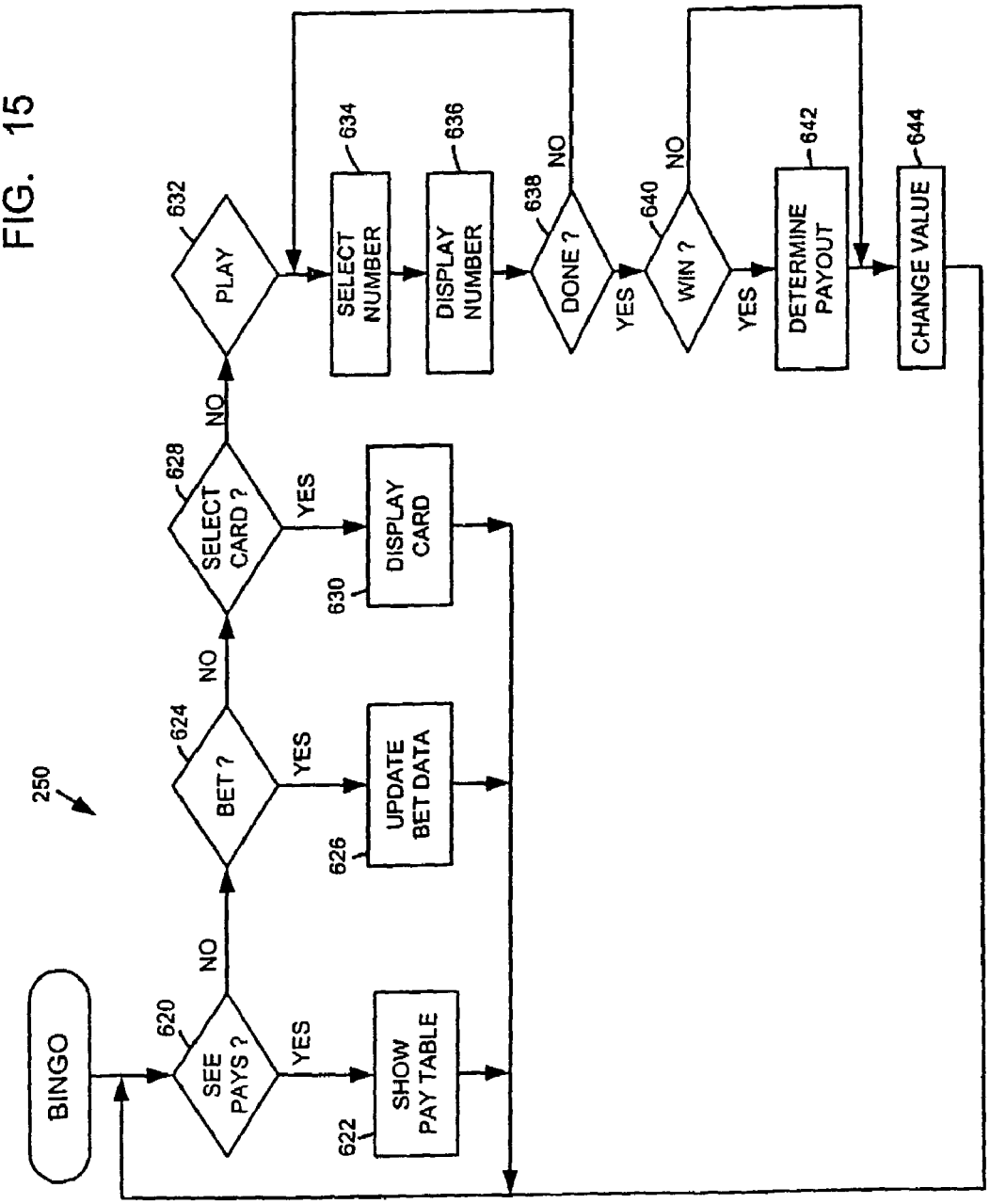

THREE-DIMENSIONAL AUTOSTEREOSCOPIC IMAGE DISPLAY FOR A GAMING APPARATUS

BACKGROUND

This patent is directed to a casino gaming apparatus, which could be either an individual gaming unit or a casino gaming system having a plurality of gaming units, each gaming unit including a display unit that displays three-dimensional images.

Conventional casino gaming units often included multiple display panels for displaying a variety of images. The gaming unit consisted of three separate displays: the top-box (or "top glass"), the belly (or "bottom") glass, and the main player (or "primary") display. The belly glass was typically a static, two-dimensional, planar image that provided game instructions, game information, casino information, images to attract players to the game, images to provide security, or images otherwise associated with the games that could be played on the gaming unit. The top-box has included a planar, two-dimensional monitor to display active, two-dimensional, planar images or a mechanical device having mechanical moving parts, either of which provided bonus game play or were used to attract players. The main player display has included active, two-dimensional planar images that may vary as part of a player-attract sequence or as part of the game play. Mechanical moving parts were often used to display a variety of images as part of the game play. For example, in a conventional slot machine, the main player display was a "reel glass" having multiple spinning reels with various images on each reel. Some of the active images provided by the top-box or main player display were three-dimensional objects shown as planar, two-dimensional images provided on a two-dimensional, planar display such as a CRT or flat-screen monitor. The two-dimensional, planar display would display a virtual three-dimensional image using shading and perspective effects, though the image would still appear two-dimensional. Virtual three dimensional images were also generated with the aid of additional devices such as optical beam-splitters, parabolic mirrors, layered displays, and three-dimensional glasses.

SUMMARY OF THE INVENTION

In one aspect, the invention is directed to a gaming apparatus which may include a display unit capable of displaying three-dimensional images, a value input device, and a controller operatively coupled to the display unit and the value input device. The display unit may include a display screen which may have a plurality of display pixels and a lenticular screen coupled with the display screen. The controller may comprise a processor and a memory, and may be programmed to cause the display unit to generate a game display, to receive image data relating to a combination of a plurality of perspective views of an image, the plurality of perspective views being interlaced to form the image, to cause the display unit to generate a three-dimensional display from the image data, and to determine a value payout associated with an outcome of a game. The three-dimensional display may include a first perspective view of the image when the image is viewed from a first angle and a second perspective view of the image when the image is viewed from a second angle, where the first and second perspective views may be displayed simultaneously.

In another aspect, the invention is directed to a gaming method which may include causing a game display of one of the following games to be generated: poker, blackjack, slots, keno or bingo, receiving image data relating to a combination of a plurality of perspective views of an image, the plurality of perspective views being interlaced to form the image, causing a three-dimensional display to be generated from the image data, and determining a value payout associated with an outcome of the game represented by the video image. The three-dimensional display may include a first perspective view of the image when the image is viewed from a first angle and a second perspective view of the image when the image is viewed from a second angle, where the first and second perspective views may be displayed simultaneously.

In a further aspect, the invention is directed to a memory having a computer program stored therein. The computer program may be capable of being used in connection with a gaming apparatus. The memory may include a memory portion physically configured in accordance with computer program instructions that would cause the gaming apparatus to generate a game display representing one of the following games: poker, blackjack, slots, keno or bingo, a memory portion physically configured in accordance with computer program instructions that would cause the gaming apparatus to receive image data relating to a combination of a plurality of perspective views of an image, the plurality of perspective views being interlaced to form the image, a memory portion physically configured in accordance with computer program instructions that would cause the gaming apparatus to generate a three-dimensional display from the image data, and a memory portion physically configured in accordance with computer program instructions that would cause the gaming apparatus to determine a value payout associated with an outcome of the one game. The three-dimensional display may include a first perspective view of the image when the image is viewed from a first angle and a second perspective view of the image when the image is viewed from a second angle, where the first and second perspective views may be displayed simultaneously.

Additional aspects of the invention are defined by the claims of this patent.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

FIG. 15 is a flowchart of an embodiment of a video bingo routine that may be performed by one or more of the gaming units.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
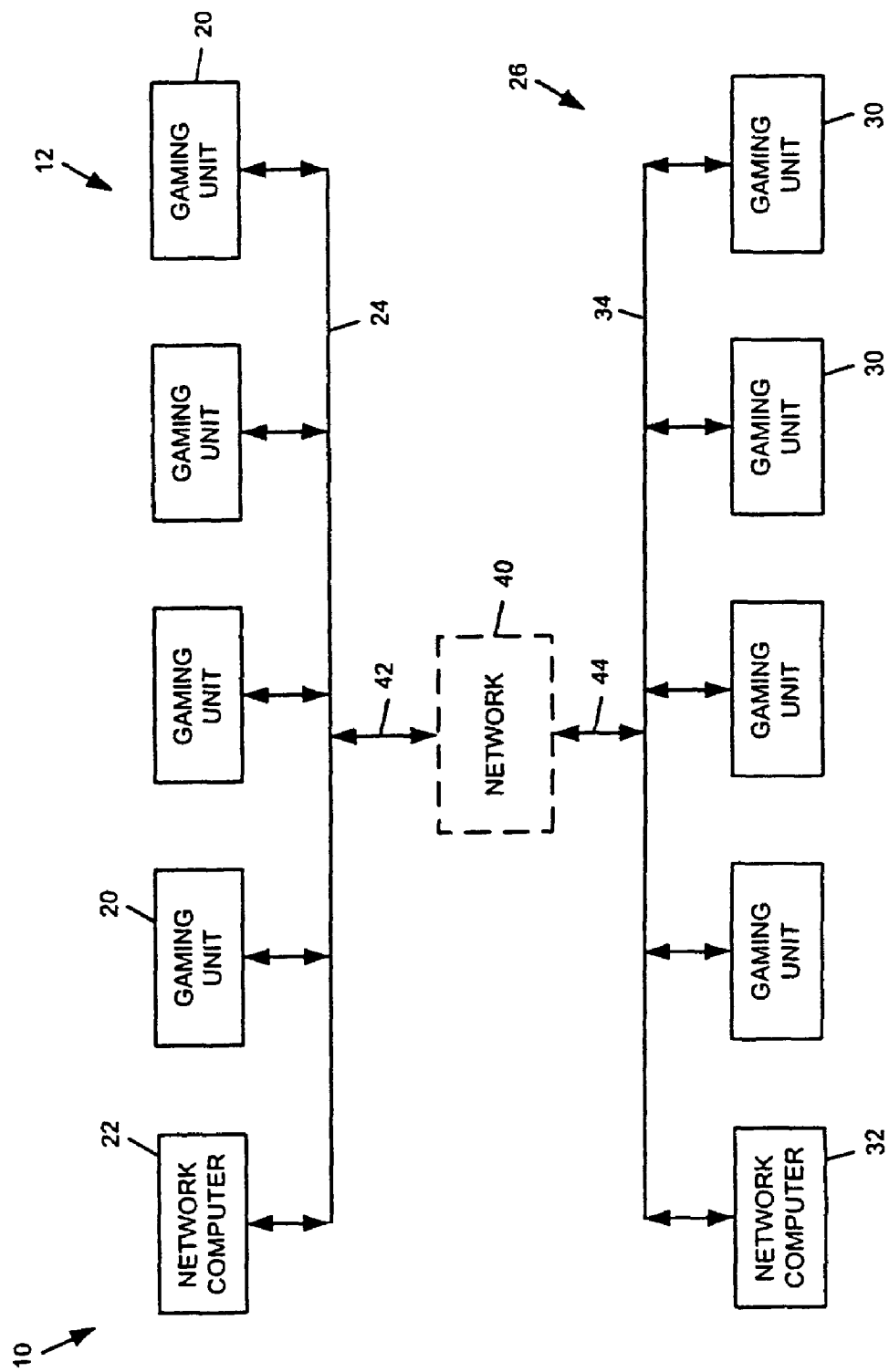
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Figure 2:
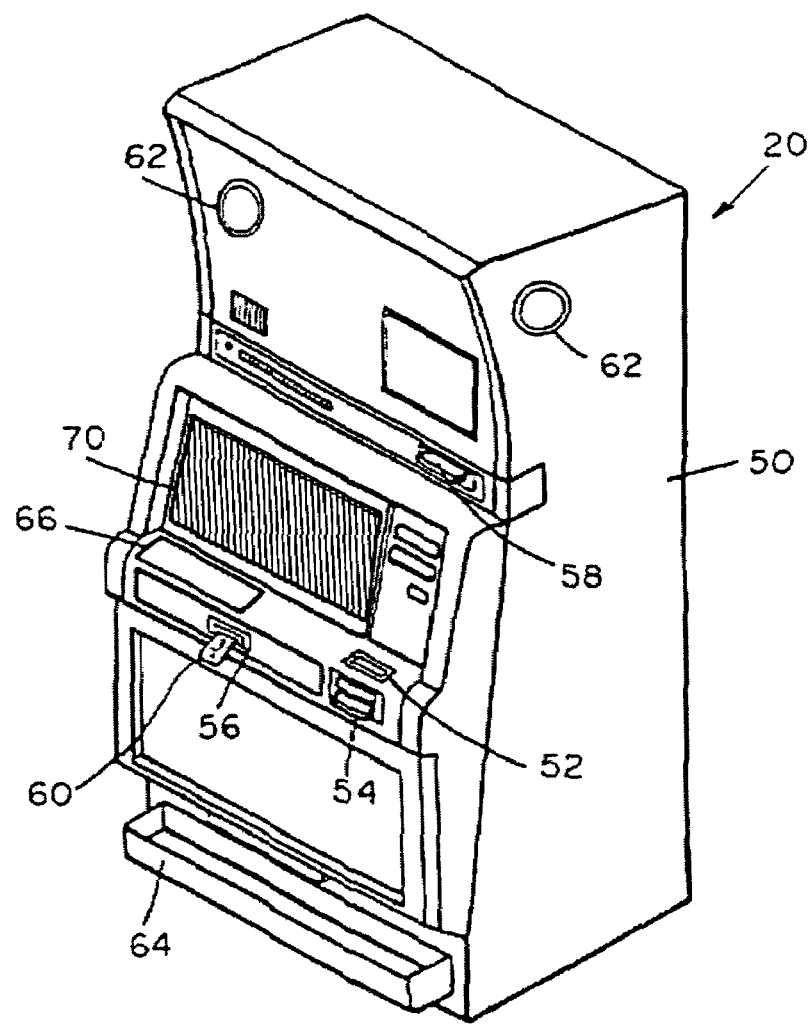
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a display unit 70. Where the gaming unit 20 is designed to facilitate play of a video casino game, such as video poker or video slots, the display unit 70 may be a color video display unit that displays images relating to the particular game or games. Where the gaming unit 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
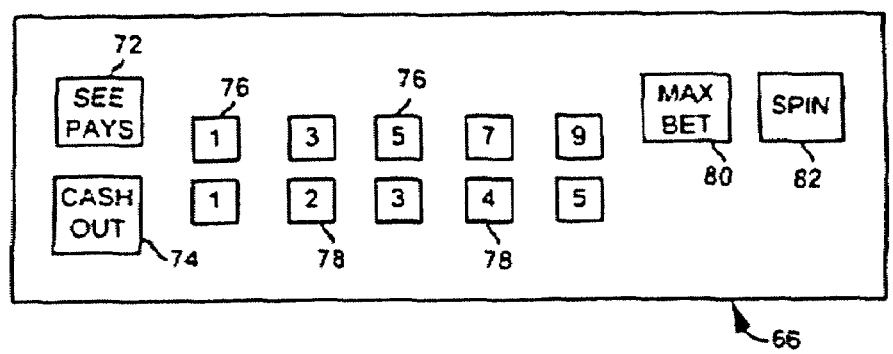
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, if the display unit 70 is provided in the form of a video display unit, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the display unit 70 is provided as a video display unit, the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Three-Dimensional Display

Figure 2B:
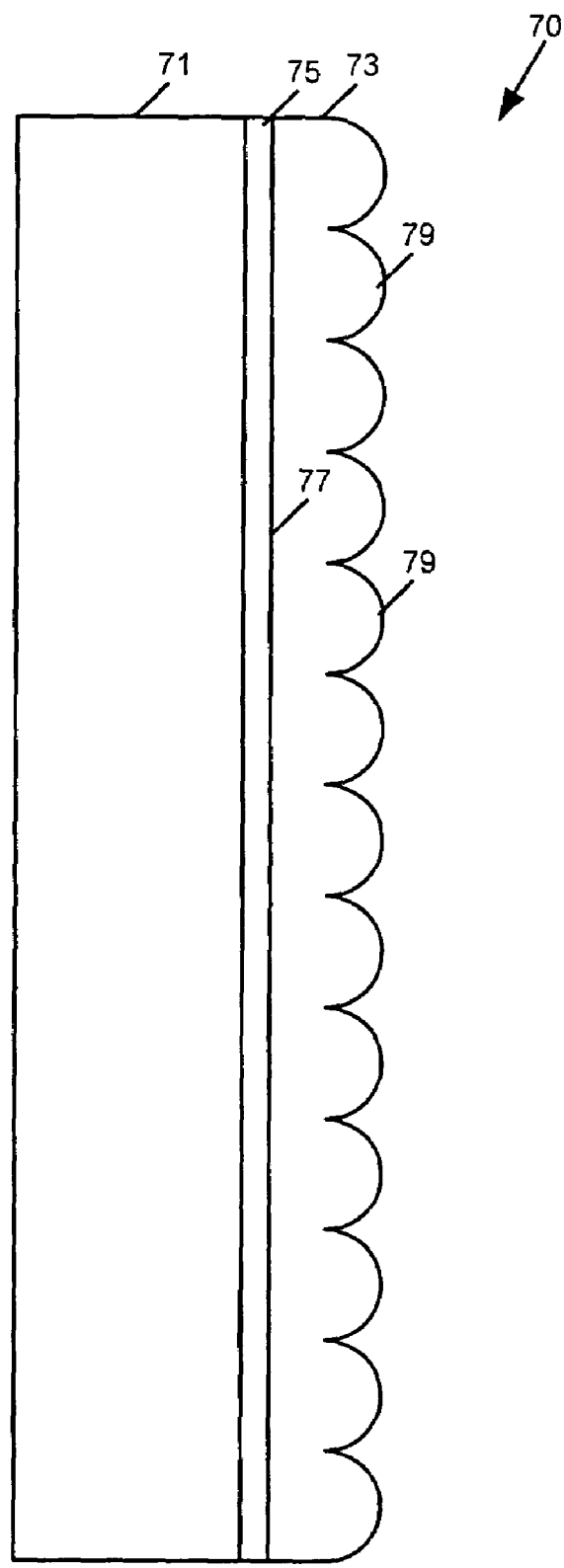
FIG. 2B illustrates an embodiment of a three-dimensional display unit for a gaming unit.

FIG. 2B is a cross-sectional diagram of a three-dimensional display unit that may be used as the display unit 70 shown in FIG. 2, though the three-dimensional display unit described herein is equally applicable to any other display unit that may be provided with the gaming unit 20. Generally, the display unit 70 may include a flat display screen 71 (i.e., a flat-screen display), which may be a plasma display panel (PDP), a liquid crystal display (LCD), a liquid crystal on silicon (LCOS) display, a light emitting diode (LED) display, a ferroelectric LCD display, a field emissions display (FED), an electroluminescent display (ELD), a front projection display, a rear projection display, and a microelectromechanical device (MEM) display such as a digital micromirror device (DMD) display or a grating light valves (GLV) display, etc. The display unit 70 may further include organic display technologies such as an organic electroluminescent (OEL) display and an organic light emitting diode (OLED) display, as well as a light emitting polymer display. The display unit 70 is not limited to flat-panel-display (FPD) technology though most of the above examples are different types of flat screen technology. The pixels of a flat-panel-display allow the image to lie on the surface of the display which may allow the lenticular screen, discussed below, to be more easily aligned with the pixels or sub-pixels (i.e., red, green, blue components). The display unit 70 may have a high screen resolution with at least 1000 pixels in each horizontal display line and 1000 in each vertical display line, though the exact number of pixels may be higher or lower depending on the screen ratio. Generally, a display unit 70 having at least 1,000,000 pixels total may be considered acceptable. Examples of possible display unit 70 resolutions include 1080×1024, 1280×1040, 1600×1200 and 3840×2400.

The display unit 70 may also include a lenticular lens or screen 73 disposed on, over or otherwise held in juxtaposition with the viewing surface 75 of the display screen 71. In FIG. 2B, the display surface 75 is provided as a protective glass or transparent polymer sheet disposed over the display screen 71. The lenticular screen 73 may generally have a smooth surface 77 on one side and lenticules 79 disposed on the opposing side. As shown in FIG. 2B, the lenticules 79 may face the observer/player and the smooth surface 77 may face the display surface 75 of the display screen 71. In another example, the smooth surface 77 may include an anti-reflective coating and face the observer/player with the lenticules 79 facing the display surface 75.

The lenticular screen 73 may include lenticules 79 running vertically or at an angle (e.g., slanted) as shown in FIG. 2. Slanted lenticules 79 may be used to compensate for moire patterns that may result from the optics of the lenticular screen 73 and equalize image resolution in the horizontal and vertical directions. An example of such a lenticular screen 73 is disclosed in U.S. Pat. No. 3,409,351 which is expressly incorporated by reference herein. The lenticules 79 may be thin enough so as to not be noticeable or obtrusive to the player/observer, though the size of the lenticules 79 may depend on the particular resolution of the display unit 70, the size of the pixels, the number of pixels or sub-pixels aligned with each lenticule 79, and other variables as known to those of ordinary skill in the art. If the lenticules 79 face the display screen 71, the lenticules 79 may be less noticeable and obtrusive to the player/observer. Each lenticule 79 may have a focal length that is not less than the thickness of the protective glass 75 such that the focal point is on the same plane as the pixels. If the lenticular screen 73 faces outward with the lenticules 79 facing away from the display screen 71, a larger focal length may be needed.

Each lenticule 79 may be aligned with a particular set or column of pixels or sub-pixels. The lenticular screen 73 may be aligned with the pixels or sub-pixels of the display unit 70 using moire interferometry to display an image having multiple perspectives and allow the player/observer to view the different perspectives at different angles. The lenticular screen 73 may be made from a material matching the characteristics of the display screen 71 material, which may be glass or transparent polymer. The matching materials may help to maintain alignment of the pixels with the lenticules 79 due to temperature variations or other effects that may affect the lenticules 79 and the display screen 71. An example of a lenticular screen 73 is disclosed in U.S. patent application Ser. No. 09/943,890, entitled "Autostereoscopic Lenticular Screen," which was filed on Aug. 30, 2001 and published under Publication No. US 2002/0036825, and which is hereby expressly incorporated by reference herein. The display unit 70 may be an autostereoscopic display sold by Stereographics, Corp. of California under the trademark SynthaGram.

Figure 2C:
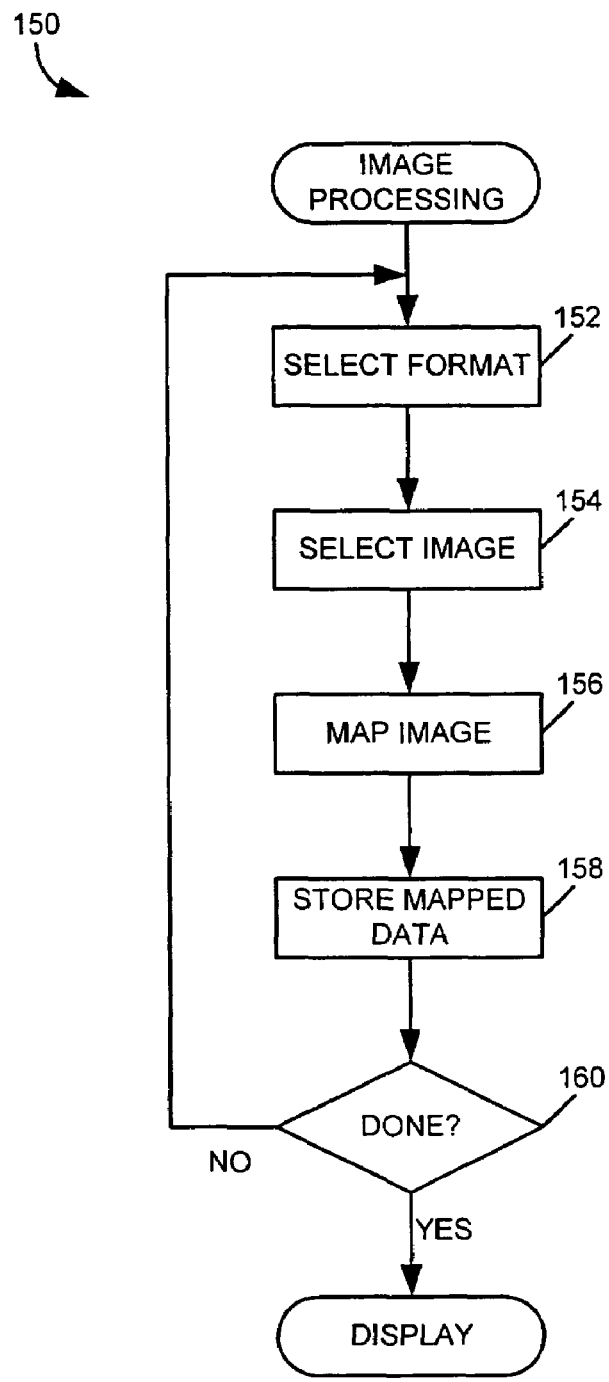
FIG. 2C is a flowchart of an embodiment of an image processing routine that may be performed to create interdigitated image data.

FIG. 2C is a flowchart depicting how image data representing multiple perspectives of an object, and hence multiple images, may be manipulated to be simultaneously displayed on the display unit 70 and allow the player/observer to view the different perspectives (i.e., multiple images) of the object from different angles thereby giving the appearance of three-dimensions. Beginning at block 152, previously captured image data may be retrieved and an output format may be selected.

The image data may be captured using multiple cameras arranged in a line along a plane thereby providing an image source from multiple perspectives. The arrangement of the cameras may be dependent on the desired perspective. For example, upper-lower perspectives may require a camera(s) for the upper perspective and a camera(s) for the lower perspective. Each camera may record an image of an object from its perspective and the raw image data may from each camera may be stored. The image may be a static image or an animated image. Alternatively, the object may be created using three-dimensional rendering software and multiple virtual cameras may record an image of the object from different perspectives. While the image data may include two or more perspective views, nine perspective views may be preferable to maintain the aspect ratio of the image and provide sufficient perception of the object in three-dimensions from various angles. Fewer than nine perspective views may lessen the overall angle of view.

Figures 2D, 2F:
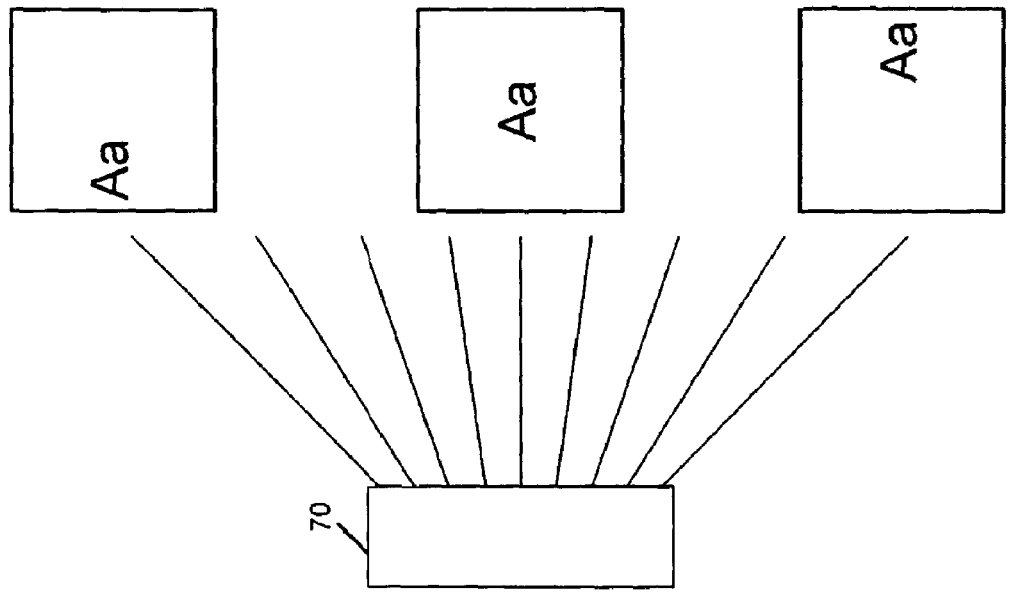
FIG. 2D illustrates an embodiment of a format that may be used for multiple perspectives views during operation of the routine of FIG. 2C.
FIG. 2F illustrates an embodiment of a three-dimensional image being displayed on a display unit from interdigitated data.

If nine perspective views are used, a nine tile format may be selected at block 152 which arranges the various perspective views in a three-by-three pattern as shown in FIG. 2D. The nine images may initially be arranged starting with the leftmost perspective in the top left corner and ending with the rightmost perspective in the bottom right corner, though this may not be how the various perspective views are ultimately displayed on the display unit 70. The overall resolution of a single perspective view may thereby be reduced to one-ninth of the overall image resolution. This may also be approximately one-ninth the resolution of the display unit 70. If two images are used, a two image horizontal format or a two image vertical format may be selected thereby reducing the overall resolution of a particular perspective view by approximately one-half. The selected format may depend on the number of perspective views recorded, which may be displayed in various arrays (e.g., three-by-three, horizontal side-by-side, vertical side-by-side, etc.). The resolution of a particular perspective view may be approximately the total resolution of the image (or of the display unit 70) divided by the number of perspective views being displayed.

Returning to FIG. 2C, after a format has been selected at block 152, image data for a particular perspective view may be selected for processing at block 154. If the image data is an animated video image, each image may be selected and processed on a frame-by-frame basis. At block 156, the routine 150 may map the pixels of the perspective views to the pixels or sub-pixels of the display unit 70 so as to juxtapose the pixels or sub-pixels of the perspective views with the lenticules 79 of the lenticular screen 73 for optimum viewing of the various perspectives. The various perspective images may thereby be sampled and interlaced together into a single, multiple-view image. This process may also be known as a form of interdigitation which may be performed by a process described in U.S. patent application Ser. No. 09/876,630, entitled "Autostereoscopic Pixel Arrangement Techniques," which was filed on Jun. 7, 2001 and published under Publication No. US 2002/0011969, and which is hereby expressly incorporated by reference herein. Software for processing the image is also available from Stereographics, Corp. of California under the name Interzig™. Interdigitation or interlacing may involve sampling the pixels from the image data of each perspective view from the chosen format and determining the best location for each pixel in the final image to produce a single, multiple-view image that is a combination of samplings from each of the perspective images. In other words, the final image is an interdigitated or interlaced image of the various perspectives. When viewed with a lenticular screen 73, the interdigitated image may have the appearance of depth (i.e., appear three-dimensional) where one angle of view has one perspective view and another angle of view had a different perspective view.

Figure 2E:
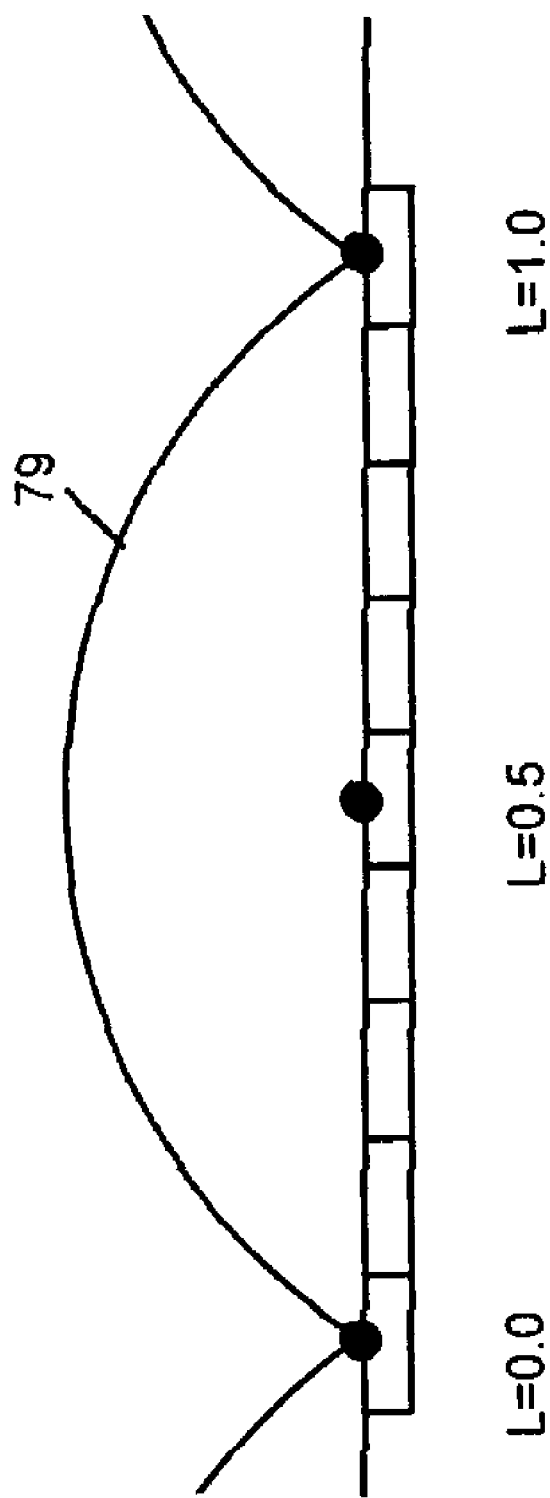
FIG. 2E illustrates an embodiment of an arrangement of pixels or sub-pixels beneath a lenticule.

The mapping performed at block 156 may be performed on a pixel-by-pixel or subpixel-by-subpixel basis, whereby the routine 150 determines the best fitting pixel image from the nine-by-nine format to display at a particular pixel or sub-pixel of the display unit 70. FIG. 2E is a diagram of how a row of pixels of subpixels may be positioned beneath a lenticule 79 and how the position of the pixel or sub-pixel may be used to determine what pixel or sub-pixel image will be displayed. At a given pixel or sub-pixel of the display unit 70, the routine 150 may determine that a pixel from the leftmost perspective image may best be displayed at that pixel or sub-pixel. This determination may be based on where the pixel or sub-pixel is positioned in relation to a lenticule 79, and may thereby be calculated for every row or group of pixels or sub-pixels within a particular lenticule 79. For example, the position of the center of each pixel or sub-pixel within a single lenticule 79 may be defined by L, where the position of the center of a pixel or sub-pixel on the left edge of the lenticule 79 may be given as L=0.0, the position of the center pixel or sub-pixel at the center of the lenticule 79 may be L=0.5 and the position of the center of a pixel or sub-pixel at the right edge of the lenticule 79 may be L=1.0. The best fitting perspective image for a given pixel position may be given by the equation:

$$C=(1-L)\times(N-1)$$

where N is the number of perspective views (i.e., perspective images) and C is the best fitting perspective image for a given pixel or sib-pixel within the lenticule 79. The first perspective image, numbered 1, may represent a far-left-eye view and the last perspective image, numbered N, may represent a far-right-eye view. For example, if N=9 perspective images, and the center of the sub-pixel being computed resides ⅓ of the way from the left edge to the right edge of the lenticule 79 that sits above it, then the best fitting perspective image for that sub-pixel may be $(1-0.333)\times(9-1)$, or 5.336, which may be rounded to the nearest integer (i.e., perspective image number 5).

If the number of perspective images N is relatively small, it may be useful to apply an averaging of pixel values from more than one perspective image. To do this, L, which represents the position of the center of the sub-pixel or pixel relative to the lenticule 79 above it, may be replaced with $L_1$ and $L_2$:

$$L_1=L-R/2$$

$$L_2=L+R/2$$

where R is the horizontal width of the sub-pixel or pixel relative to the horizontal width of the lenticule 79. R may also be set to be smaller or larger than the actual sub-pixel or pixel width. If $L_1$ is less than zero, 1 may be added to the value of $L_1$ so that $L_1$ is greater than or equal to 0.0. If $L_2$ is greater than 1.0, 1 should be subtracted such that $L_2$ is less than or equal to 1.0. The best fitting perspective image may then be calculated as:

$$C_1=(1-L_1)\times(N-1)$$

$$C_2=(1-L_2)\times(N-1)$$

If N=21 perspective images, and the center of the sub-pixel being computed resides ⅓ of the way from the left edge to the right edge of the lenticule 79 that sits above it, and the horizontal width of the sub-pixel is one-tenth of the horizontal width of the lenticule 79, then L=0.333, R=0.1, $L_1$=0.333−0.05, $L_2$=0.333+0.05, $C_1$=(1−0.283)×20=14.33, and $C_2$=(1−0.383)×20=12.33. Based on this calculation, we have a range from $C_1$ to $C_2$, or from 14.33 down to 12.33 in this example. A weighted average may be applied to the pixel values obtained from components $C_1$ to $C_2$, (e.g., perspective images 14, 13 and 12). The appropriate proportional weightings in the example may be determined as follows:

master image weighting 12=(12.5−12.33)/(14.33−12.33) =0.085 master image weighting 13=(13.5−12.5)/(14.33−12.33) =0.500 master image weighting 14=(14.33−13.5)/(14.33−12.33) =0.415

When a particular perspective image has been chosen as the best perspective for a particular pixel or sub-pixel, block 156 may further include determining which pixel of the chosen perspective image should be displayed at the pixel or sub-pixel of the display unit 70. This may be determined simply by mapping the desired interdigitated sub-pixel or pixel being calculated to the chosen perspective image(s). For example, if the best perspective image is image 5, then the pixel image taken from image 5 may be determined by mapping the location of the pixel or sub-pixel of the final single image (which includes all perspectives) to the coordinates of image 5. Generally, the best fitting pixel mapped from each master image should be used, though a weighted average of the values of several pixels that map to a desired range may also be appropriate.

In some cases, the perspective images may be the same size and/or resolution of the final image of the various perspectives, though the perspective images may also be smaller to simplify the process described above. In either case, pixels may be mapped proportionally from the appropriate perspective image(s) to the final, interdigitated image. For example, the final interdigitated image being calculated may have a grid of 4800 sub-pixels horizontally (which would be the case if the horizontal display resolution was 1600 RGB pixels, and each of those 1600 pixels consisted of three distinct single-color sub-pixels), and 1024 sub-pixels vertically, and the perspective images may each have a smaller resolution of 520 pixels horizontally by 340 vertically. To calculate the value of interdigitated sub-pixel (X,Y) of the final interdigitated image, the best fitting master image pixel may be (X×520/4800, Y×340/1024), where the lower-left pixel in all cases is (0,0). Thus, while the perspective image may have a resolution only a fraction of the display unit 70, the routine 150 may determine what is the best fitting pixel from the perspective view.

The above techniques apply regardless of whether the lenticules 79 are parallel to the pixel columns of the display screen 71 or slanted relative to the pixel columns. The only difference between lenticules 79 that are not slanted and lenticules 79 that are slanted is that a slanted lenticule 79 implementation may consider the amount of slant (i.e., the angle) in order to properly calculate the horizontal position L of a pixel relative to the lenticule 79 that is placed above it. If the interdigitated sub-pixel being calculated is red-only, green-only, or blue-only, then only the appropriate color element from the master image pixel(s) may be used.

Once the mapping or interdigitation process is complete, the interdigitated image data may be stored at block 158, with each pixel of the interdigitated image having been assigned a pixel or sub-pixel on the display unit 70. The interdigitated image data is made up of the image data from the various perspective views whose pixels are mapped to be precisely positioned with the lenticules 79 of the lenticular screen 73. A digital video interface may ensure that each pixel image of the interdigitated image is displayed at the proper pixel or sub-pixel of the display unit 70. At block 160, the routine 150 determines whether all images have been processed. If not, the routine 150 may return to block 152 to repeat the process for another image. If complete, the routine 150 may end the process and the interdigitated image data may be displayed on the display unit 70.

FIG. 2F is a diagram of how the interdigitated data may be displayed on the display unit 70 and how the player/observer may observe different perspectives of the image at different angles, thereby providing a three-dimensional effect to the image displayed on the display unit 70. A controller 100, described further below, may receive the interdigitated data from Referring to FIG. 2F, the player/observer may view a first stereo pair from a first angle, which may be to the right of the display unit 70 and a second stereo pair from a second angle, which may be the left of the display unit 70. The particular stereo pairs viewed by the player/observer thereby depends on the viewing angle. A stereo pair may provide the image with the illusion of depth because one eye may see one perspective view and the other eye may see another perspective view (i.e., two slightly different images), which is a principle of stereoscopics and lenticular screens 73 known by those of ordinary skill in the art. With nine perspective views having been interdigitated into a single image, at any given angle in front of the display unit 70, the player/observer may see two of nine perspective images by viewing two stereo pairs. Because each perspective view is a different perspective of the same object or scene, the overall image may be given a three-dimensional effect because the perspective view changes as the viewing angle changes, similar to how the perspective of a three-dimensional object may change as a person moves or moves his head.

Gaming Unit Electronics

Figure 3:
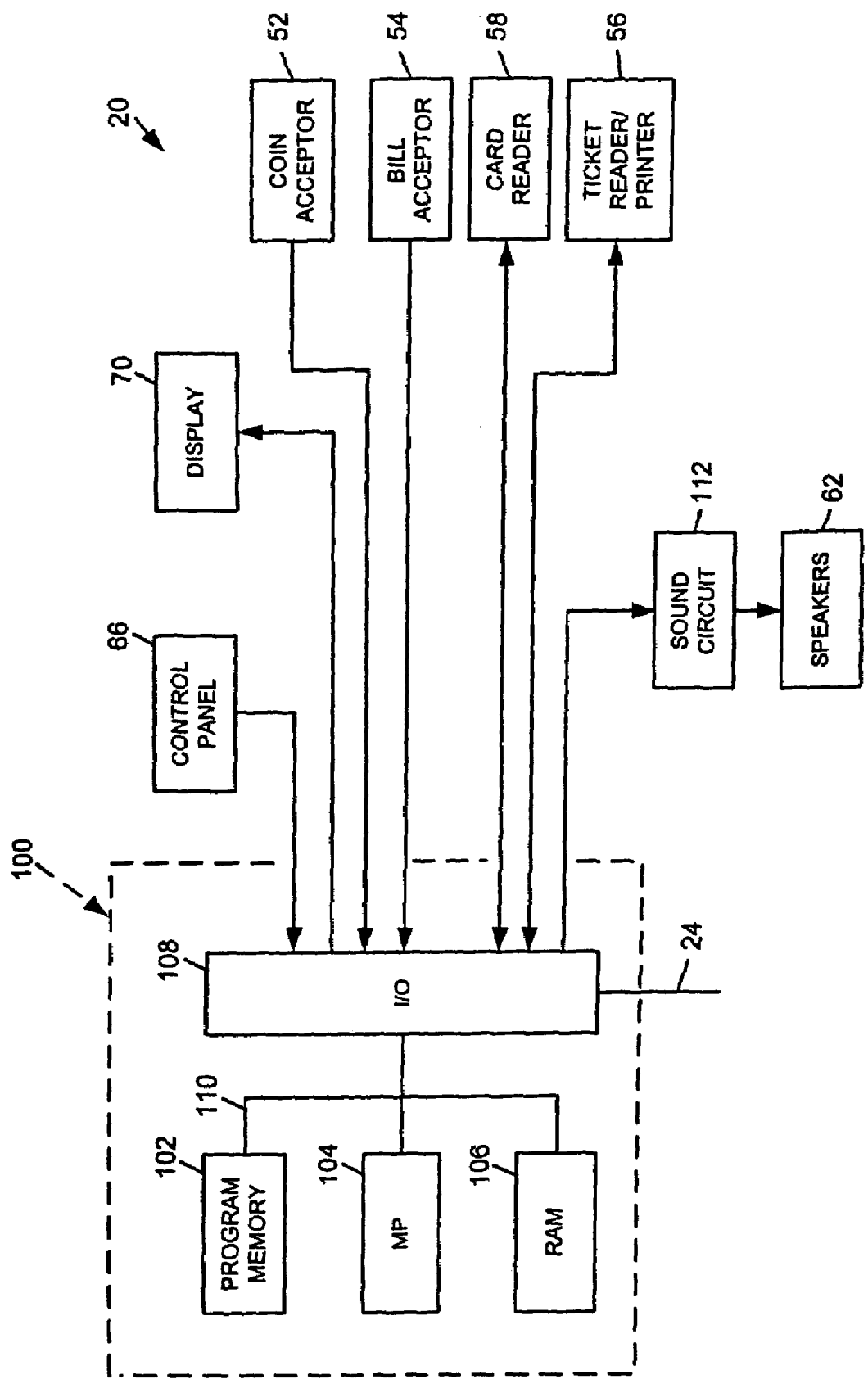
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an, input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58, the ticket reader/printer 56 and the display unit 70 may be operatively coupled to the I/O circuit 108, each of those components being so coupled by either a unidirectional or bidirectional, single-line or multiple-line data link, which may depend on the design of the component that is used. The display unit 70 may be operatively coupled to the I/O circuit 108 via a digital video interface. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
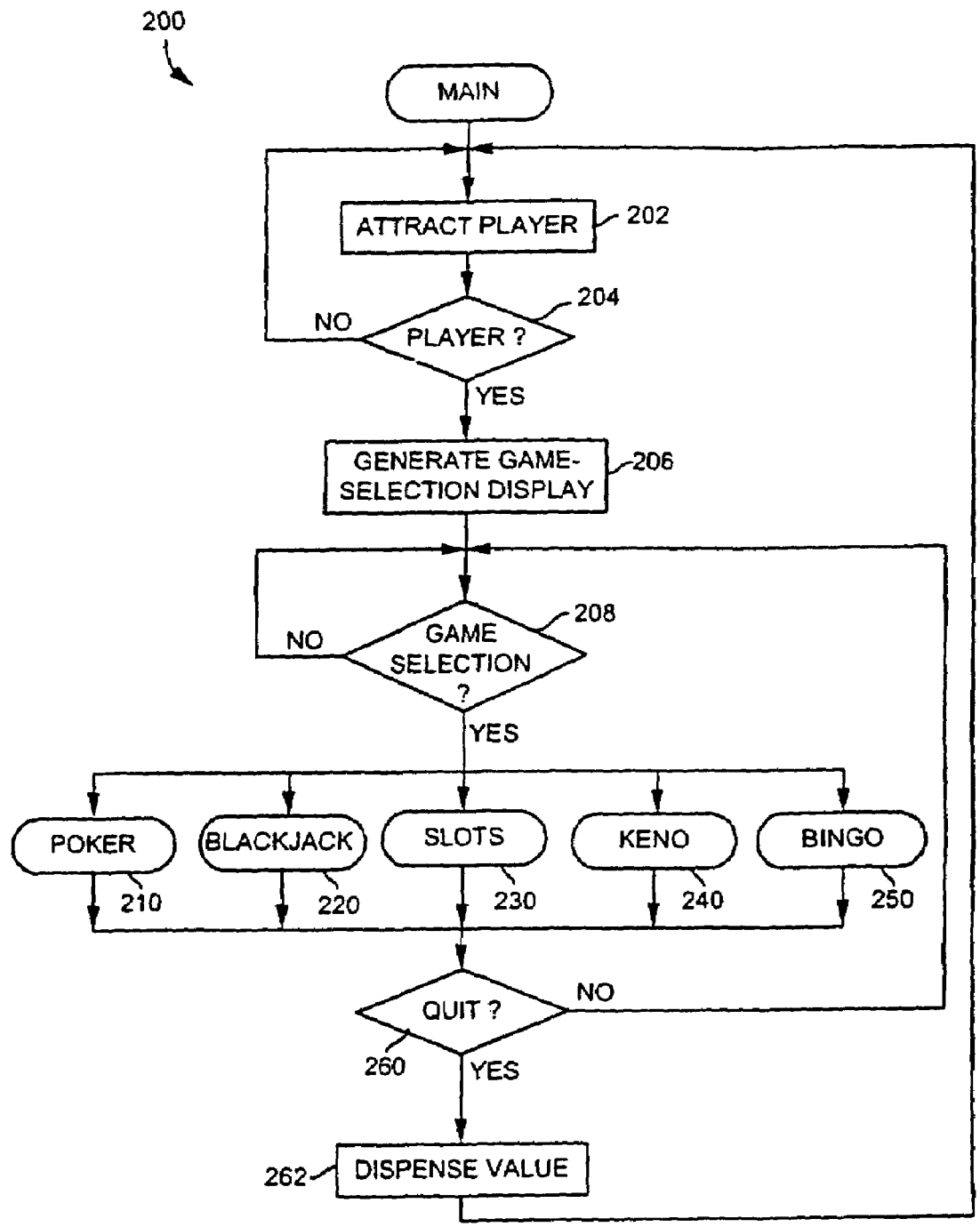
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 (if provided as a video display unit) at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
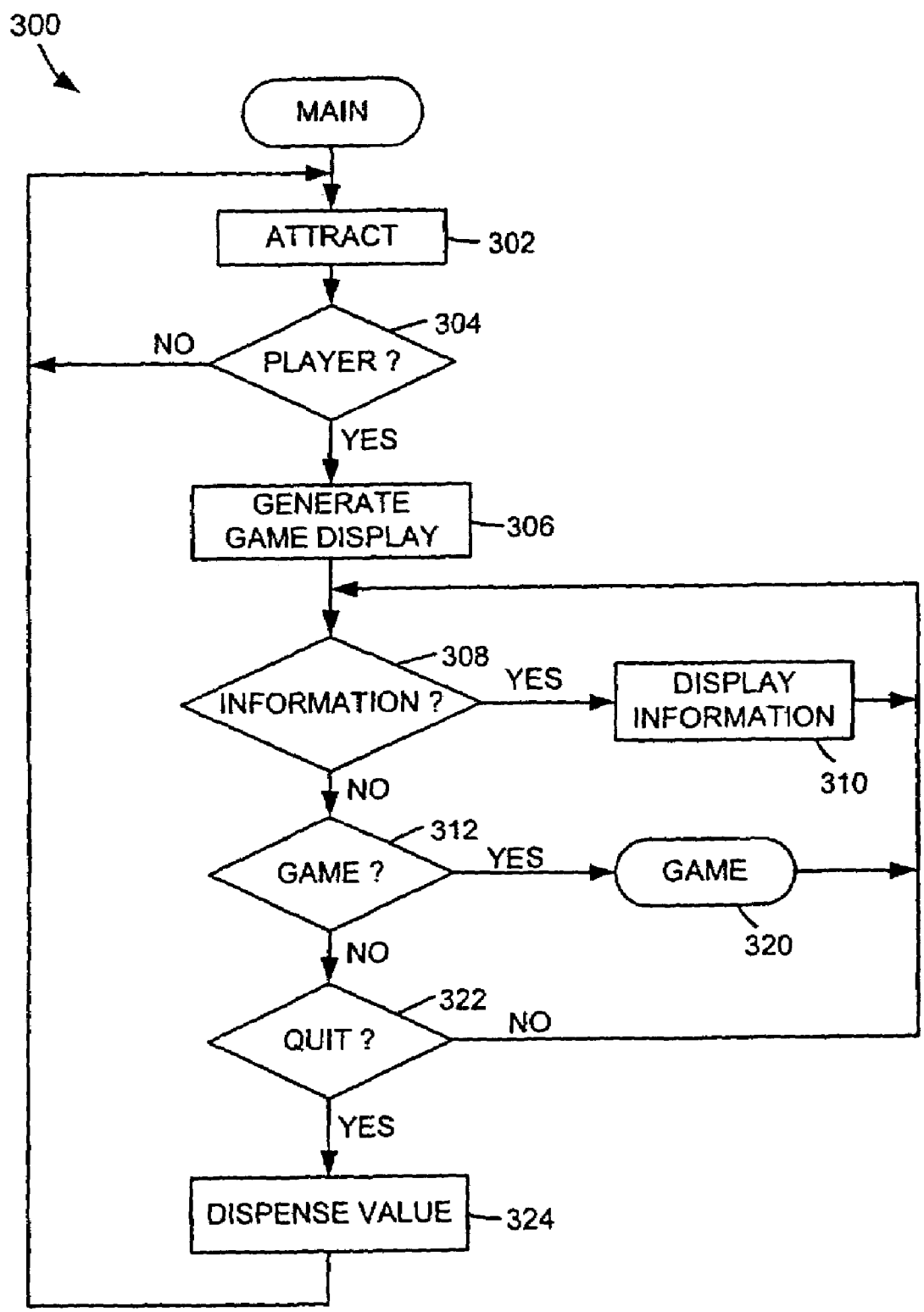
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 (if provided as a video display unit) at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Three-Dimensional Display Operation

Figure 5A:
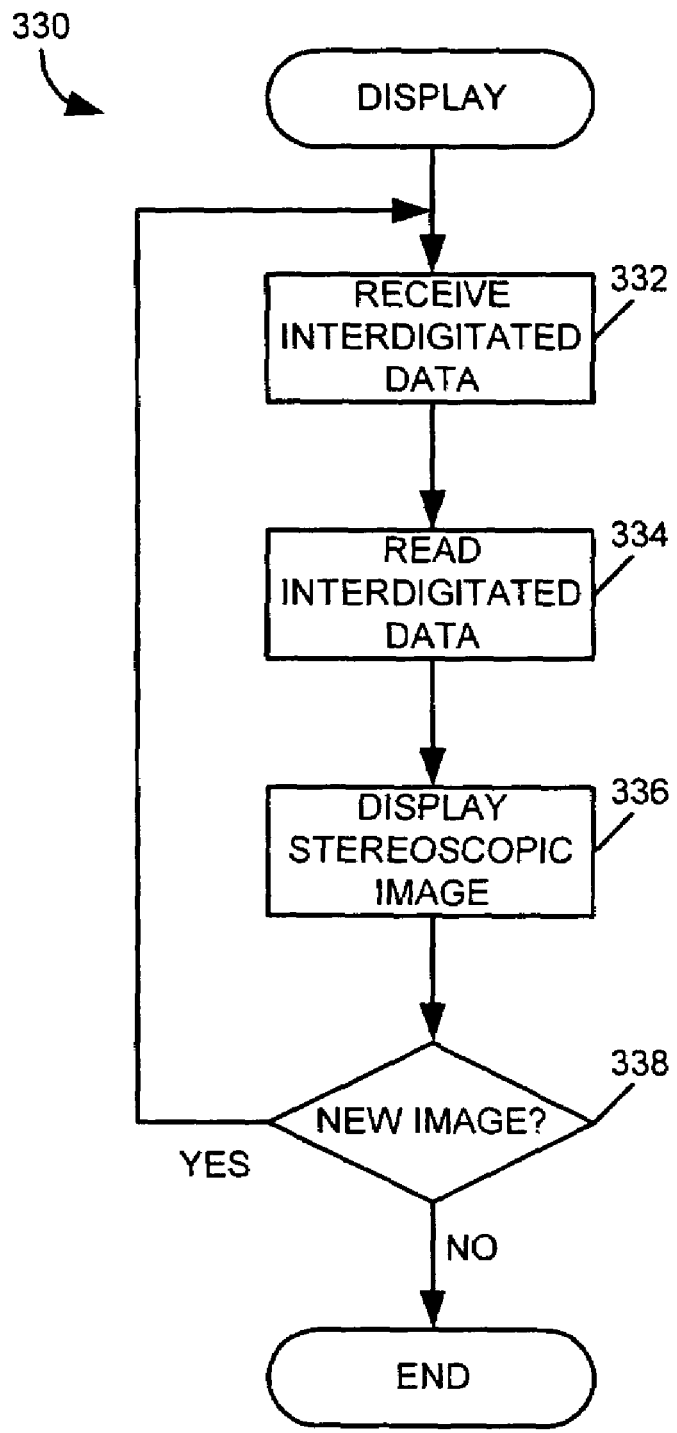
FIG. 5A is a flowchart of a display routine that may be performed during operation of one or more of the gaming units.

Any image displayed on the display unit 70, including the image displays discussed herein, may be displayed as a three-dimensional display, which may sometimes be referred to as an autostereoscopic display. Generally, an autostereoscopic display may involve a technique that allows the player/observer to see depth in the image by combining the perspective images and simultaneously looking at two perspectives of an image without requiring additional viewing glasses or the like. This effect may be accomplished by displaying the interdigitated data with the lenticular screen 73. As discussed above, various perspective views of an object, scene or other image may be interdigitated and stored as interdigitated data. The interdigitated data may be displayed as a combination of multiple perspective views with each view having the appearance of three-dimensions. FIG. 5A is a flowchart of a display routine 330 that may be stored in the memory of the controller 100. Referring to FIG. 5A, the display routine 330 may begin operation at block 332 during which interdigitated data may be received by the controller 100 and temporarily stored in a memory such as the random-access memory (RAM) 106. The interdigitated data may represent a single or multiple images each having multiple perspectives which may be static or animated images. For example, the controller 100 may receive and store an entire video file of interdigitated data or receive the video file on a frame-by-frame basis.

When the interdigitated data has been received, the controller 100 may read the interdigitated data at block 334 in order to read and display the three-dimensional, autostereoscopic image. In reading the data, the controller 100 may read pixel data and mapping information which may be encoded as part of the interdigitated data. The pixel data may allow the controller 100 to determine the color, intensity, placement, etc. of each pixel or sub-pixel image. The mapping information may allow the controller 100 to determine where a particular pixel image is to be displayed on the display unit 70 such that the player/observer will be able to clearly view multiple perspectives of the image. When the controller 100 has read the interdigitated data of the image, the controller 100 may cause the image data to be displayed on the display unit 70. Using the mapping data, the controller 100 may cause each pixel image, or sub-pixel image, to be displayed on a particular pixel or sub-pixel of the display screen 71. The display of the image at block 336 may be performed using a digital video interface (DVI). When displayed according to the mapping data and viewed in conjunction with the lenticular screen 73, the image may have the appearance of three-dimensions with multiple perspectives that change with the viewing angle. When an image has been displayed, the display routine 330 may determine if a new image is to be received and displayed at block 338.

Figure 6:
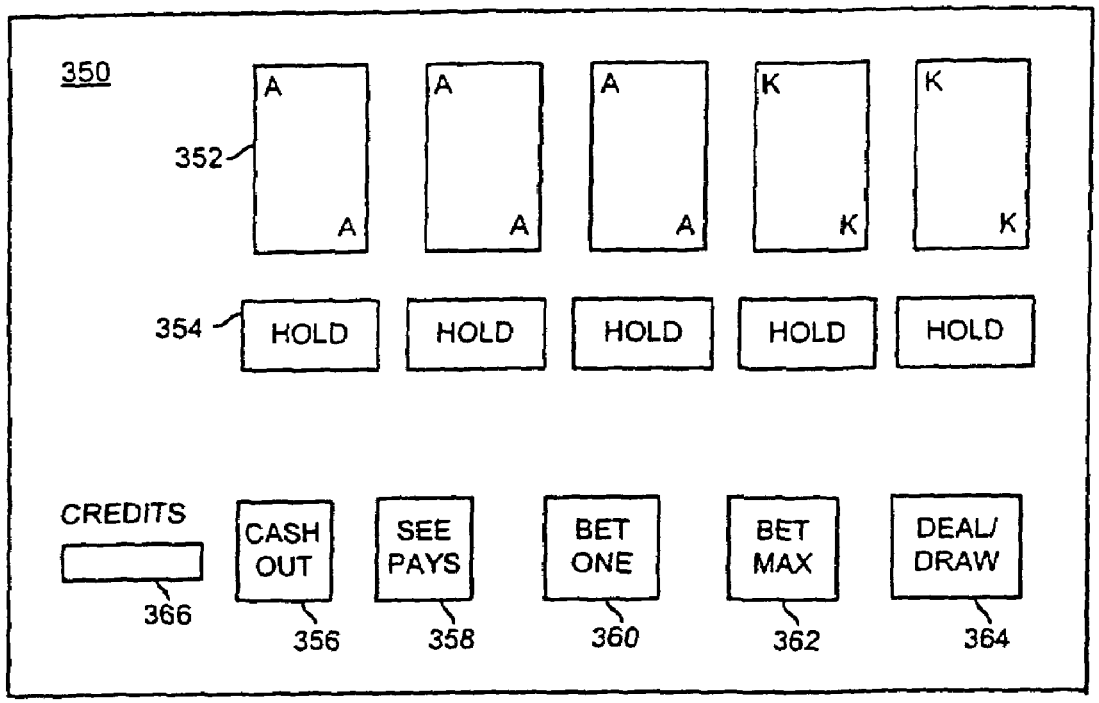
FIG. 6 is an illustration of an embodiment of a visual display that may be displayed during performance of the video poker routine of FIG. 8.

Video Poker

Where the gaming unit 20 is designed to facilitate play of a video poker game, the display unit 70 may comprise a video display unit. FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
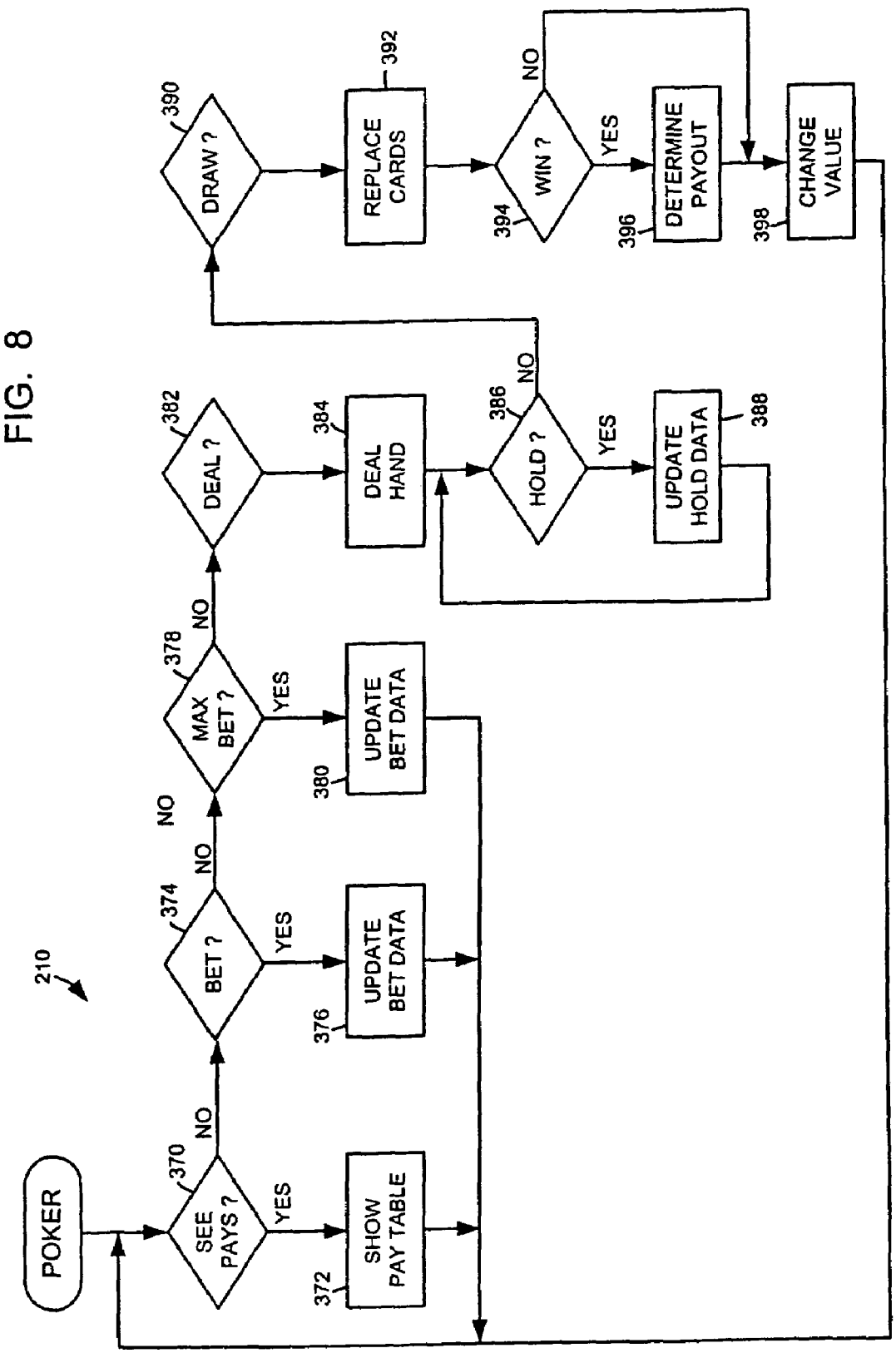
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 7:
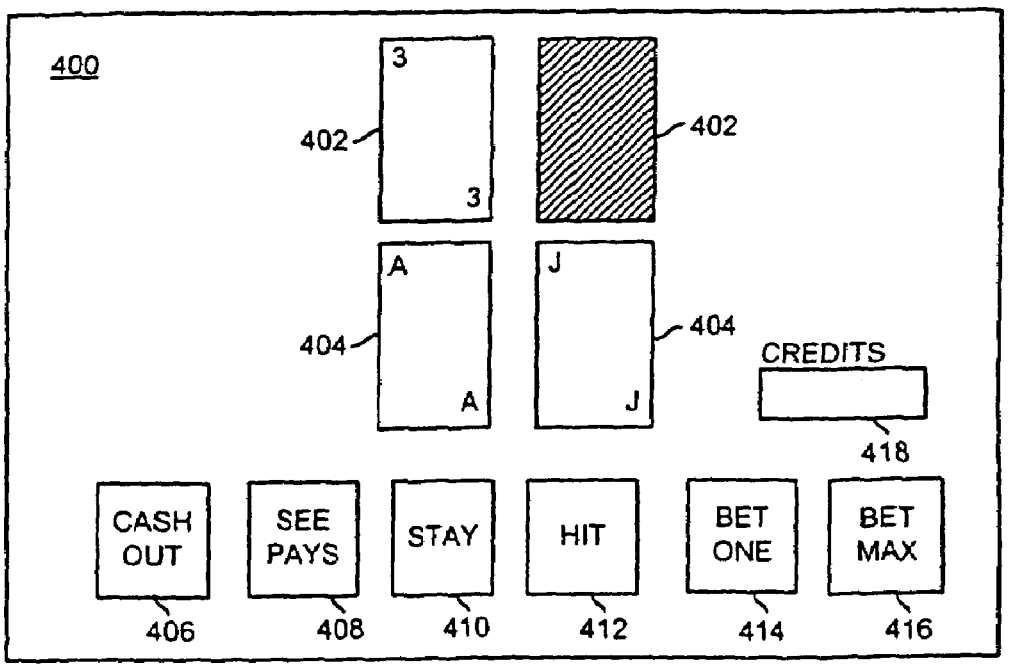
FIG. 7 is an illustration of an embodiment of a visual display that may be displayed during performance of the video blackjack routine of FIG. 9.

Video Blackjack

Where the gaming unit 20 is designed to facilitate play of a video blackjack game, the display unit 70 may comprise a video display unit. FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
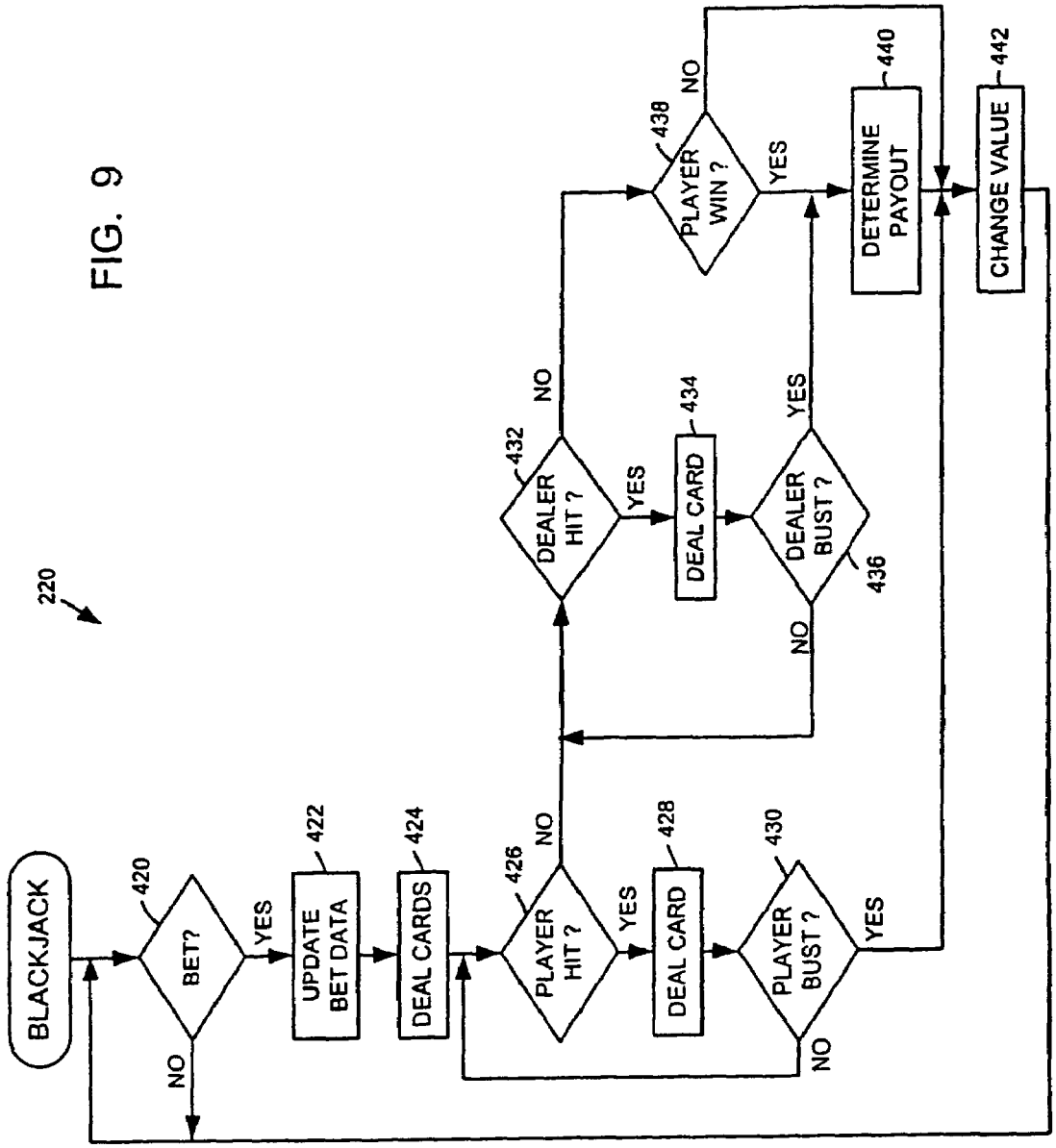
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

Where the gaming unit 20 is designed to facilitate play of a video slots game, the display unit 70 may comprise a video display unit. FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
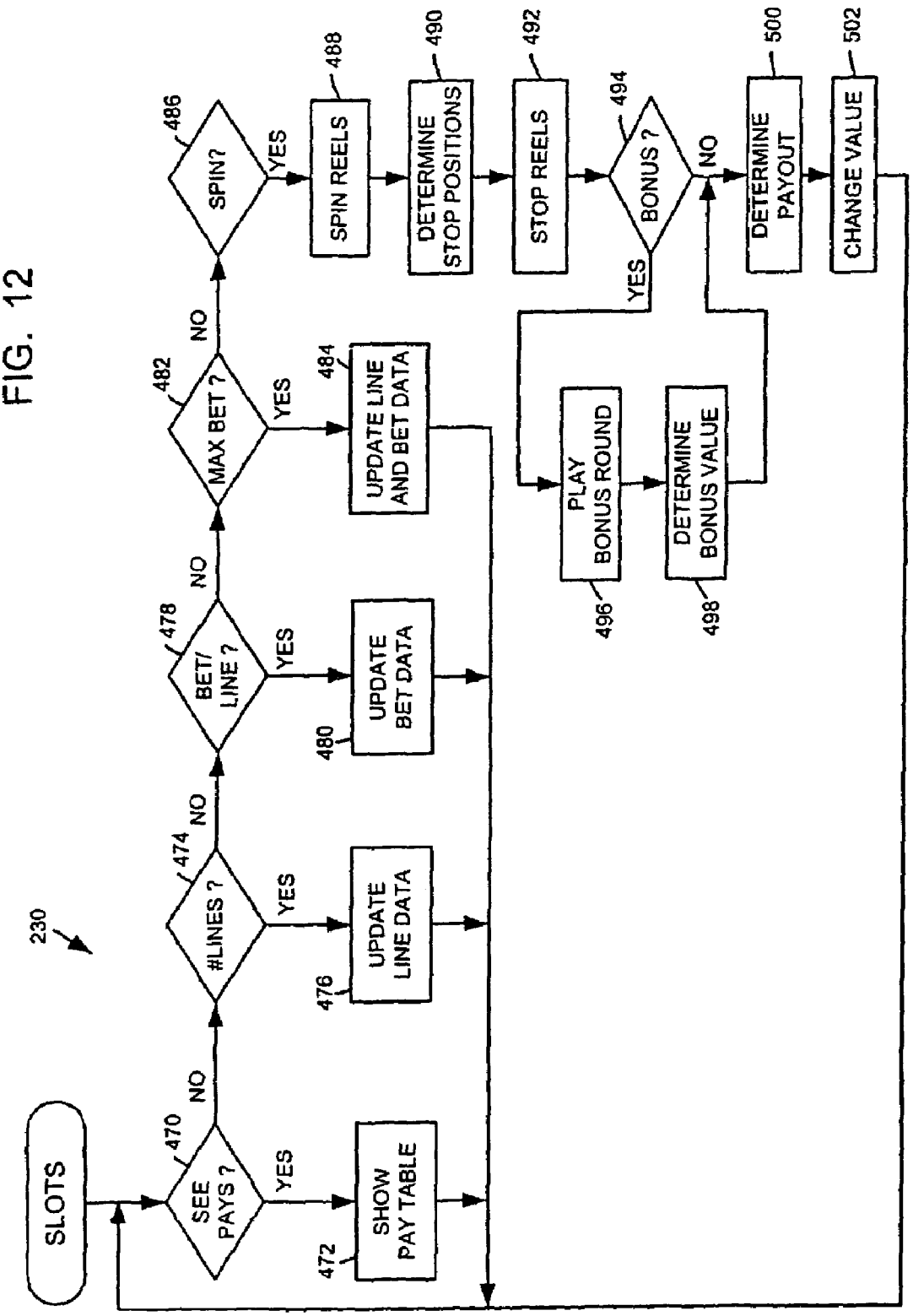
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Video Keno

Where the gaming unit 20 is designed to facilitate play of a video keno game, the display unit 70 may comprise a video display unit. FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
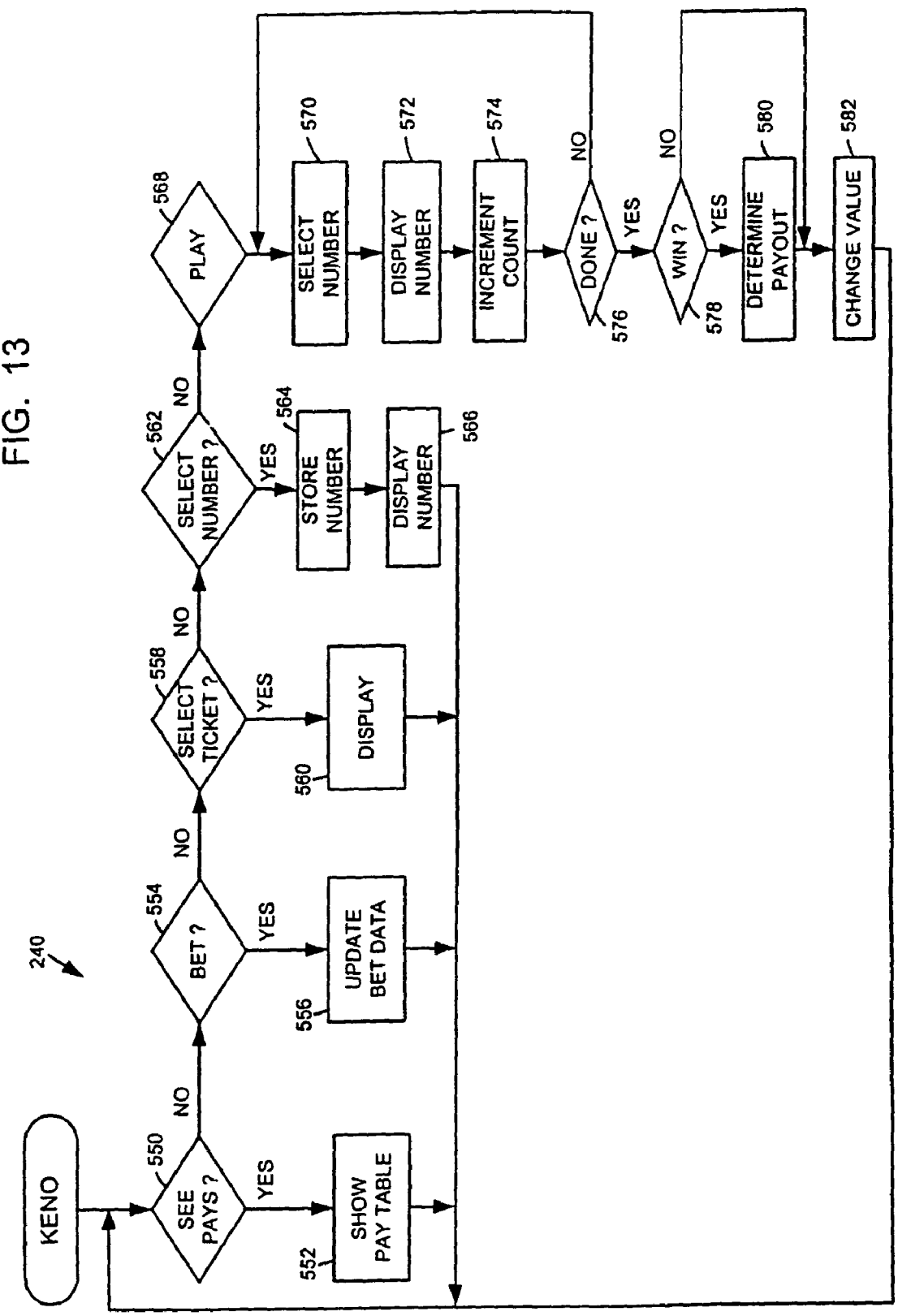
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Figure 14:
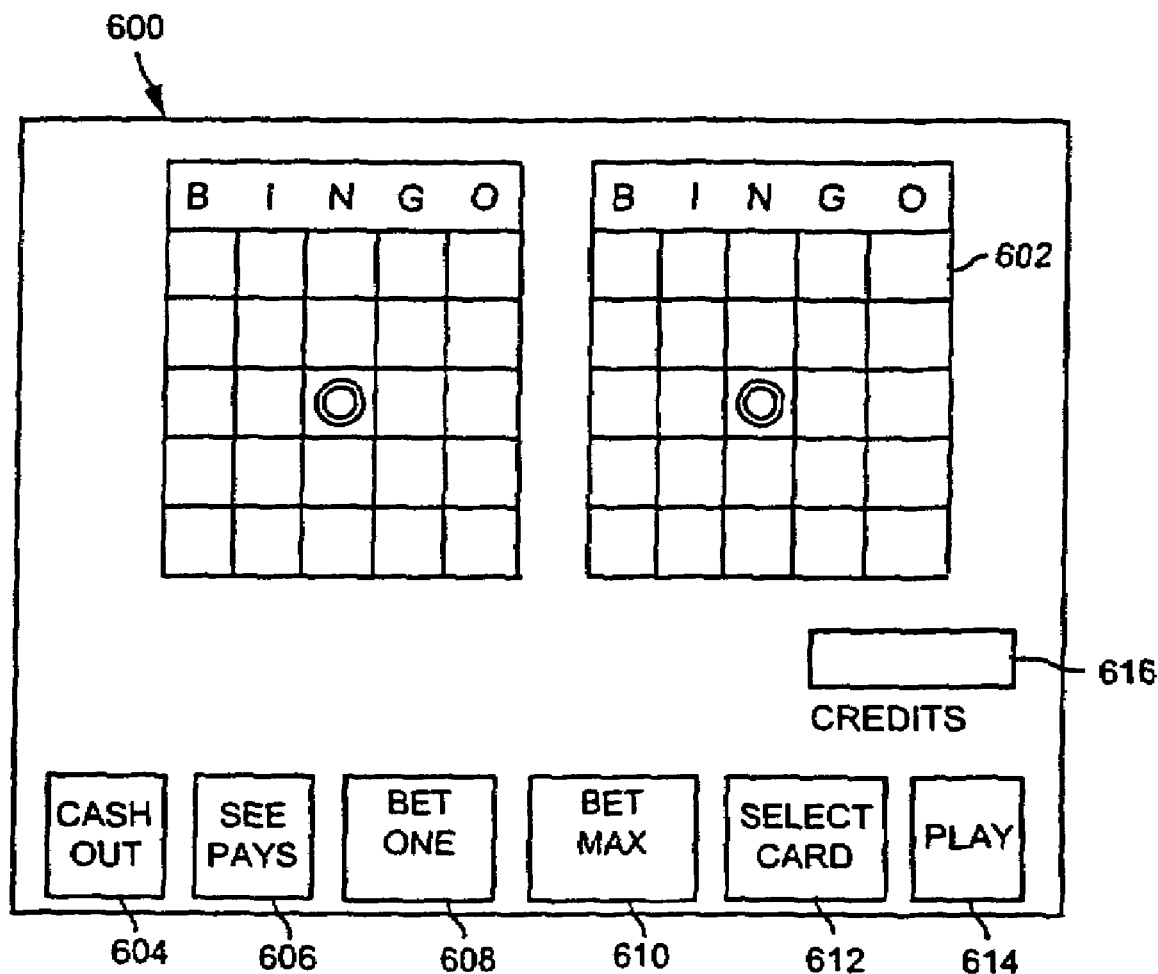
FIG. 14 is an illustration of an embodiment of a visual display that may be displayed during performance of the video bingo routine of FIG. 15.

Video Bingo

Where the gaming unit 20 is designed to facilitate play of a video bingo game, the display unit 70 may comprise a video display unit. FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

What is claimed is:
1. A gaming device, comprising:
   a gaming controller;
   memory;
   a display unit comprising a display screen including a first plurality of display pixels;

a lenticular screen coupled with said display screen, the lenticular screen comprising a plurality of lenticules; and a value input device;

the gaming device being operable and configured to:

control a wager-based game played at the gaming device;

process image data relating to a first image to be displayed at the display unit, the image data including a plurality of stereoscopic images representing N perspective views of the first image, wherein each stereoscopic image has associated therewith a respective plurality of image pixels;

identify a selected pixel mapping algorithm for use in mapping selected image pixels associated with one or more selected portions of the stereoscopic images to respective display pixels of the display screen, wherein the selected pixel mapping algorithm corresponds to a first pixel mapping algorithm if a value of N corresponds to a first value, and wherein the selected pixel mapping algorithm corresponds to a second pixel mapping algorithm, different from the first pixel mapping algorithm, if the value of N corresponds to a second value, different from the first value;

generate, using the selected pixel mapping algorithm, pixel mapping information relating to a mapping of selected image pixels associated with one or more selected portions of the stereoscopic images to respective display pixels of the display screen;

display at the display screen, using at least a portion of the pixel mapping information, one or more selected portions of the stereoscopic images in a manner which results in juxtaposition of at least some of the selected image pixels with one or more respective lenticules of the lenticular screen; and display the one or more selected portions of the stereoscopic images in a manner which creates a three-dimensional appearance of the first image at the display unit when viewed by an observer.

2. The gaming device of claim 1 being further operable to: simultaneously display selected portions of at least two different stereoscopic images representing different perspectives of the first image in a manner which creates the three-dimensional appearance of the first image at the display unit when viewed by the observer, wherein different perspective views of the first image are perceived by the observer from different viewing angles of the display unit.

3. The gaming device of claim 1 being further operable to: select a desired pixel mapping algorithm for use in generating the pixel mapping information using information relating to the N perspective views of the first image, wherein the first pixel mapping algorithm is selected as the desired pixel mapping algorithm if the value of N corresponds to the first value, and wherein the second pixel mapping algorithm is selected as the desired pixel mapping algorithm if the value of N corresponds to the second value.

4. The gaming device of claim 1:

wherein the image data includes nine different stereoscopic images representing nine perspective views of the first image, the nine different stereoscopic images including a combination of three horizontal perspective views and three vertical perspective views;

wherein said lenticular screen is configured to facilitate presentation of nine perspective views in a manner which creates the three-dimensional appearance of the first image at the display unit when viewed by the observer; and wherein the lenticular screen comprises a plurality of cylindrical-shaped lenticules.

5. The gaming device of claim 1:

wherein the image data includes nine different stereoscopic images representing nine perspective views of the first image, the nine different stereoscopic images including a combination of three horizontal perspective views and three vertical perspective views;

wherein said lenticular screen is configured to facilitate presentation of nine perspective views in a manner which creates the three-dimensional appearance of the first image at the display unit when viewed by the observer; and wherein the device is further operable to simultaneously interlace the display of selected portions of the different stereoscopic images in a manner which results in the display of the three-dimensional appearance of the first image.

6. The gaming device of claim 1:

wherein the image data includes nine different stereoscopic images representing nine perspective views of the first image, the nine different stereoscopic images including a combination of three horizontal perspective views and three vertical perspective views; and wherein at least a portion of the selected pixel mapping algorithm is based upon an expression according to:

$$C=(1-L)\times(N-1),$$

wherein L represents a center position of a first display pixel which is associated with a respective first lenticule;

wherein N represents the number of perspective views; and wherein C represents a selected stereoscopic image of the plurality of stereoscopic images which is to be utilized for display in association with the first display pixel.

7. The gaming device of claim 1 wherein at least some display pixels of the first display screen have associated therewith one or more respective sub-pixels, the device being further operable to:

generate, using the selected pixel mapping algorithm, sub-pixel mapping information relating to a mapping of selected image pixels associated with one or more selected portions of the stereoscopic images to respective display sub-pixels of the display screen;

display at the display screen, using at least a portion of the sub-pixel mapping information, one or more selected portions of the stereoscopic images in a manner which results in juxtaposition of at least some of the selected image pixels with one or more respective lenticules of the lenticular screen.

8. The gaming device of claim 1 wherein the first image includes a first image portion representing an image of a virtual mechanical reel of a slot machine, the device being further operable to:

display at the display unit the first image portion in a manner which creates a three-dimensional appearance of the displayed image of the virtual mechanical slot machine reel when viewed by the observer.

9. The gaming device of claim 1 wherein the first image includes a first image portion representing an image of a virtual mechanical reel of a slot machine, the device being further operable to:

display, at the display unit, the first image portion in a manner which provides the observer with an appearance of depth of the displayed image of the virtual mechanical slot machine reel.

10. The gaming device as defined in claim 1, wherein said display unit comprises a video display unit, and wherein the image data includes a plurality of stereoscopic video images, the device being further operable to:
cause said display unit to generate a game display relating to at least one wager-based game selected from a group consisting of: poker, blackjack, slots, keno and bingo.

11. The gaming device as defined in claim 10 being further operable to:
cause a video image comprising an image of at least five playing cards to be displayed if said game comprises video poker;
cause a video image comprising an image of a plurality of simulated slot machine reels to be displayed if said game comprises video slots;
cause a video image comprising an image of a plurality of playing cards to be displayed if said game comprises video blackjack;
cause a video image comprising an image of a plurality of keno numbers to be displayed if said game comprises video keno; and
cause a video image comprising an image of a bingo grid to be displayed if said game comprises video bingo.

12. The gaming device as defined in claim 1 wherein said display unit additionally comprises at least one mechanical slot machine reel.

13. The gaming device as defined in claim 1 wherein at least a first portion of said lenticular screen is aligned in juxtaposition with said display screen.

14. The gaming device as defined in claim 1:
wherein said lenticular screen includes a plurality of substantially parallel columns of lenticules;
wherein the plurality of substantially parallel columns of lenticules are disposed at an angle (A) relative to a selected axis of the display screen; and
wherein data relating to the angle (A) is used for generating the pixel mapping information.

15. The gaming device as defined in claim 1,
wherein the lenticular screen comprises a first side comprising a plurality of lenticules and a second side comprising a substantially smooth surface;
wherein said second side comprises an anti-reflective surface;
wherein the first side of the lenticular screen is positioned to face the display screen; and
wherein the second side of lenticular screen is positioned to face an observer of the display screen.

16. The gaming device as defined in claim 1, wherein each of said display pixels comprise a plurality of sub-pixels arranged in a plurality of columns and wherein each of said lenticules are aligned with one of said columns.

17. The gaming device of claim 1, wherein the gaming device applies the second pixel mapping algorithm by averaging a plurality of pixel values from more than one of the plurality of stereoscopic images.

18. A gaming system, comprising:
at least one gaming device comprising a display system, the display system including a display screen including a first plurality of display pixels, the display system further including a lenticular screen coupled with said display screen, the lenticular screen comprising a plurality of lenticules;
at least one server communicatively coupled to the at least one gaming device;
at least one controller;
memory;
a value input system;
the gaming system being operable and configured to:
control a wager-based game played at the at least one gaming device;
process image data relating to a first image to be displayed at the display system, the image data including a plurality of stereoscopic images representing N perspective views of the first image, wherein each stereoscopic image has associated therewith a respective plurality of image pixels;
identify a selected pixel mapping algorithm for use in mapping selected image pixels associated with one or more selected portions of the stereoscopic images to respective display pixels of the display screen, wherein the selected pixel mapping algorithm corresponds to a first pixel mapping algorithm if a value of N corresponds to a first value, and wherein the selected pixel mapping algorithm corresponds to a second pixel mapping algorithm, different from the first pixel mapping algorithm, if the value of N corresponds to a second value, different from the first value;
generate, using the selected pixel mapping algorithm, pixel mapping information relating to a mapping of selected image pixels associated with one or more selected portions of the stereoscopic images to respective display pixels of the display screen;
display at the display screen, using at least a portion of the pixel mapping information, one or more selected portions of the stereoscopic images in a manner which results in juxtaposition of at least some of the selected image pixels with one or more respective lenticules of the lenticular screen; and
display the one or more selected portions of the stereoscopic images in a manner which creates a three-dimensional appearance of the first image at the display system when viewed by an observer.

19. The gaming system of claim 18 being further operable to:
simultaneously display selected portions of at least two different stereoscopic images representing different perspectives of the first image in a manner which creates the three-dimensional appearance of the first image at the display system when viewed by the observer, wherein different perspective views of the first image are perceived by the observer from different viewing angles of the display system.

20. The gaming system of claim 18 being further operable to:
select a desired pixel mapping algorithm for use in generating the pixel mapping information using information relating to the N perspective views of the first image, wherein the first pixel mapping algorithm is selected as the desired pixel mapping algorithm if the value of N corresponds to the first value, and wherein the second pixel mapping algorithm is selected as the desired pixel mapping algorithm if the value of N corresponds to the second value.

21. The gaming system of claim 18:
wherein the image data includes nine different stereoscopic images representing nine perspective views of the first image, the nine different stereoscopic images including a combination of three horizontal perspective views and three vertical perspective views;

wherein said lenticular screen is configured to facilitate presentation of nine perspective views in a manner which creates the three-dimensional appearance of the first image at the display system when viewed by the observer; and wherein the lenticular screen comprises a plurality of cylindrical-shaped lenticules.

22. The gaming system of claim 18:

wherein the image data includes nine different stereoscopic images representing nine perspective views of the first image, the nine different stereoscopic images including a combination of three horizontal perspective views and three vertical perspective views;

wherein said lenticular screen is configured to facilitate presentation of nine perspective views in a manner which creates the three-dimensional appearance of the first image at the display system when viewed by the observer; and wherein the gaming system is further operable to simultaneously interlace the display of selected portions of the different stereoscopic images in a manner which results in the display of the three-dimensional appearance of the first image.

23. The gaming system of claim 18:

wherein the image data includes nine different stereoscopic images representing nine perspective views of the first image, the nine different stereoscopic images including a combination of three horizontal perspective views and three vertical perspective views; and wherein at least a portion of the selected pixel mapping algorithm is based upon an expression according to:

$$C=(1-L)\times(N-1),$$

wherein L represents a center position of a first display pixel which is associated with a respective first lenticule;

wherein N represents the number of perspective views; and wherein C represents a selected stereoscopic image of the plurality of stereoscopic images which is to be utilized for display in association with the first display pixel.

24. The gaming system of claim 18 wherein at least some display pixels of the first display screen have associated therewith one or more respective sub-pixels, the gaming system being further operable to:

generate, using the selected pixel mapping algorithm, sub-pixel mapping information relating to a mapping of selected image pixels associated with one or more selected portions of the stereoscopic images to respective display sub-pixels of the display screen;

display at the display screen, using at least a portion of the sub-pixel mapping information, one or more selected portions of the stereoscopic images in a manner which results in juxtaposition of at least some of the selected image pixels with one or more respective lenticules of the lenticular screen.

25. The gaming system of claim 18 wherein the first image includes a first image portion representing an image of a virtual mechanical reel of a slot machine, the gaming system being further operable to:

display at the display system the first image portion in a manner which creates a three-dimensional appearance of the displayed image of the virtual mechanical slot machine reel when viewed by the observer.

26. The gaming system of claim 18 wherein the first image includes a first image portion representing an image of a virtual mechanical reel of a slot machine, the gaming system being further operable to:

display, at the display system, the first image portion in a manner which provides the observer with an appearance of depth of the displayed image of the virtual mechanical slot machine reel.

27. The gaming system as defined in claim 18, wherein said display system comprises a video display system, and wherein the image data includes a plurality of stereoscopic video images, the gaming system being further operable to:

cause said display system to generate a game display relating to at least one wager-based game selected from a group consisting of: poker, blackjack, slots, keno and bingo.

28. The gaming system as defined in claim 27 being further operable to:

cause a video image comprising an image of at least five playing cards to be displayed if said game comprises video poker;

cause a video image comprising an image of a plurality of simulated slot machine reels to be displayed if said game comprises video slots;

cause a video image comprising an image of a plurality of playing cards to be displayed if said game comprises video blackjack;

cause a video image comprising an image of a plurality of keno numbers to be displayed if said game comprises video keno; and cause a video image comprising an image of a bingo grid to be displayed if said game comprises video bingo.

29. The gaming system as defined in claim 18 wherein said display system additionally comprises at least one mechanical slot machine reel.

30. The gaming system as defined in claim 18 wherein at least a first portion of said lenticular screen is aligned in juxtaposition with said display screen.

31. The gaming system as defined in claim 18:

wherein said lenticular screen includes a plurality of substantially parallel columns of lenticules;

wherein the plurality of substantially parallel columns of lenticules are disposed at an angle (A) relative to a selected axis of the display screen; and wherein data relating to the angle (A) is used for generating the pixel mapping information.

32. The gaming system as defined in claim 18, wherein the lenticular screen comprises a first side comprising a plurality of lenticules and a second side comprising a substantially smooth surface;

wherein said second side comprises an anti-reflective surface;

wherein the first side of the lenticular screen is positioned to face the display screen; and wherein the second side of lenticular screen is positioned to face an observer of the display screen.

33. The gaming system as defined in claim 18, wherein each of said display pixels comprise a plurality of sub-pixels arranged in a plurality of columns and wherein each of said lenticules are aligned with one of said columns.

34. A gaming system, comprising:

at least one gaming device comprising a display system, the display system including a display screen including a first plurality of display pixels, the display system further including a lenticular screen coupled with said display screen, the lenticular screen comprising a plurality of lenticules;

at least one server communicatively coupled to the at least one gaming device;

at least one controller;

memory;

a value input system;

means for controlling a wager-based game played at the at least one gaming device;

means for processing image data relating to a first image to be displayed at the display system, the image data including a plurality of stereoscopic images representing N perspective views of the first image, wherein each stereoscopic image has associated therewith a respective plurality of image pixels;

means for identifying a selected pixel mapping algorithm for use in mapping selected image pixels associated with one or more selected portions of the stereoscopic images to respective display pixels of the display screen, wherein the selected pixel mapping algorithm corresponds to a first pixel mapping algorithm if a value of N corresponds to a first value, and wherein the selected pixel mapping algorithm corresponds to a second pixel mapping algorithm, different from the first pixel mapping algorithm, if the value of N corresponds to a second value, different from the first value;

means for generating, using the selected pixel mapping algorithm, pixel mapping information relating to a mapping of selected image pixels associated with one or more selected portions of the stereoscopic images to respective display pixels of the display screen;

means for displaying at the display screen, using at least a portion of the pixel mapping information, one or more selected portions of the stereoscopic images in a manner which results in juxtaposition of at least some of the selected image pixels with one or more respective lenticules of the lenticular screen; and means for displaying the one or more selected portions of the stereoscopic images in a manner which creates a three-dimensional appearance of the first image at the display system when viewed by an observer;

wherein the image data includes nine different stereoscopic images representing nine perspective views of the first image, the nine different stereoscopic images including a combination of three horizontal perspective views and three vertical perspective views;

wherein said lenticular screen is configured to facilitate presentation of nine perspective views in a manner which creates the three-dimensional appearance of the first image at the display system when viewed by the observer; and wherein the gaming system is further operable to simultaneously interlace the display of selected portions of the different stereoscopic images in a manner which results in the display of the three-dimensional appearance of the first image.

35. The gaming system of claim 34 further comprising:

means for selecting a desired pixel mapping algorithm for use in generating the pixel mapping information using information relating to the N perspective views of the first image, wherein the first pixel mapping algorithm is selected as the desired pixel mapping algorithm if the value of N corresponds to the first value, and wherein the second pixel mapping algorithm is selected as the desired pixel mapping algorithm if the value of N corresponds to the second value.

36. The gaming system of claim 34 wherein the first image includes a first image portion representing an image of a virtual mechanical reel of a slot machine, the gaming system further comprising:

means for displaying, at the display system, the first image portion in a manner which provides the observer with an appearance of depth of the displayed image of the virtual mechanical slot machine reel.

37. A gaming method comprising:

processing, by a gaming controller, image data relating to a first image of a wager-based game to be displayed at a display unit of the gaming device, the image data including a plurality of stereoscopic images representing N perspective views of the first image, wherein each stereoscopic image is associated with a respective plurality of image pixels;

identifying, by the gaming controller, a selected pixel mapping algorithm for use in mapping selected image pixels associated with one or more selected portions of the stereoscopic images to respective display pixels of a display screen of the display unit, wherein the selected pixel mapping algorithm corresponds to a first pixel mapping algorithm if a value of N corresponds to a first value, and wherein the selected pixel mapping algorithm corresponds to a second pixel mapping algorithm, different from the first pixel mapping algorithm, if the value of N corresponds to a second value, different from the first value;

generating, by the gaming controller, using the selected pixel mapping algorithm, pixel mapping information relating to mapping of selected image pixels associated with one or more selected portions of the stereoscopic images to respective display pixels of the display screen;

juxtapositioning, by the gaming controller, at least some of the selected image pixels with one or more respective lenticules of a lenticular screen by displaying at the display screen, using at least a portion of the pixel mapping information, one or more selected portions of the stereoscopic images; and creating, by the gaming controller, a three-dimensional appearance of the first image at the display unit by displaying the one or more selected portions of the stereoscopic images.

38. The gaming method of claim 37 further comprising:

creating, by the gaming controller, the three-dimensional appearance of the first image at the display unit by simultaneously displaying selected portions of at least two different stereoscopic images representing different perspectives of the first image, wherein different perspective views of the first image are perceived by an observer from different viewing angles of the display unit.

39. The gaming method of claim 37 further comprising:

selecting, by the gaming controller, a desired pixel mapping algorithm for use in generating the pixel mapping information using information relating to the N perspective views of the first image, wherein the first pixel mapping algorithm is selected as the desired pixel mapping algorithm if the value of N corresponds to the first value, and wherein the second pixel mapping algorithm is selected as the desired pixel mapping algorithm if the value of N corresponds to the second value.

40. The gaming method of claim 37, wherein the image data includes nine different stereoscopic images representing nine perspective views of the first image, the nine different stereoscopic images including a combination of three horizontal perspective views and three vertical perspective views, wherein the lenticular screen comprises a plurality of cylindrical-shaped lenticules, said gaming method further comprising:

creating, by the gaming controller, the three-dimensional appearance of the first image at the display unit by presenting nine perspective views via the lenticular screen.

41. The gaming method of claim 37, wherein the image data includes nine different stereoscopic images representing nine perspective views of the first image, the nine different stereoscopic images including a combination of three horizontal perspective views and three vertical perspective views, said gaming method further comprising:

creating, by the gaming controller, the three-dimensional appearance of the first image at the display unit by presenting nine perspective views via the lenticular screen; and displaying the three-dimensional appearance of the first image by simultaneously interlacing the display of selected portions of the different stereoscopic images.

42. The gaming method of claim 37,
wherein the image data includes nine different stereoscopic images representing nine perspective views of the first image, the nine different stereoscopic images including a combination of three horizontal perspective views and three vertical perspective views; and
wherein at least a portion of the selected pixel mapping algorithm is based upon an expression according to:

$C=(1-L)\times(N-1)$, wherein L represents a center position of a first display pixel which is associated with a respective first lenticule;
wherein N represents the number of perspective views; and
wherein C represents a selected stereoscopic image of the plurality of stereoscopic images which is to be utilized for display in association with the first display pixel.

43. The gaming method of claim 37, wherein at least some display pixels of the first display screen have associated therewith one or more respective sub-pixels, said method further comprising:

respectively displaying sub-pixels of the display screen upon generating, by the gaming controller, using the selected pixel mapping algorithm, sub-pixel mapping information related to a mapping of selected image pixels associated with one or more selected portions of the stereoscopic images;

juxtapositioning, by the gaming controller, at least some of the selected image pixels with one or more respective lenticules of the lenticular screen by displaying, at the display screen, using at least a portion of the sub-pixel mapping information, one or more selected portions of the stereoscopic images.

44. The gaming method of claim 37, wherein the first image includes a first image portion representing an image of a virtual mechanical reel of a slot machine, said method further comprising creating, by the gaming controller, a three-dimensional appearance of the displayed image of the virtual mechanical slot machine reel by displaying at the display unit the first image portion.

45. The gaming method of claim 37 wherein the first image includes a first image portion representing an image of a virtual mechanical reel of a slot machine, said method further comprising providing an observer with an appearance of depth of the displayed image of the virtual mechanical slot machine reel by displaying, at the display unit, the first image portion.

46. The gaming method as defined in claim 37, wherein said display unit comprises a video display unit, and wherein the image data includes a plurality of stereoscopic video images, said method further comprising causing the display unit to generate a game display relating to at least one wager-based game selected from a group consisting of: poker, blackjack, slots, keno and bingo.

47. The gaming method as defined in claim 37, further comprising:

causing, by the gaming controller, a video image comprising an image of at least five playing cards to be displayed if said game comprises video poker;

causing, by the gaming controller, a video image comprising an image of a plurality of simulated slot machine reels to be displayed if said game comprises video slots;

causing, by the gaming controller, a video image comprising an image of a plurality of playing cards to be displayed if said game comprises video blackjack;

causing, by the gaming controller, a video image comprising an image of a plurality of keno numbers to be displayed if said game comprises video keno; and causing, by the gaming controller, a video image comprising an image of a bingo grid to be displayed if said game comprises video bingo.

48. The gaming method as defined in claim 37, wherein said display unit additionally comprises at least one mechanical slot machine reel.

49. The gaming method as defined in claim 37, further comprising aligning at least a first portion of said lenticular screen in juxtaposition the display screen.

50. The gaming method as defined in claim 37, wherein the lenticular screen includes a plurality of substantially parallel columns of lenticules, wherein the plurality of substantially parallel columns of lenticules are disposed at an angle (A) relative to a selected axis of the display screen, said gaming method further comprising generating the pixel mapping information by using data relating to the angle (A).

51. The gaming method as defined in claim 37,
wherein the lenticular screen comprises a first side comprising a plurality of lenticules and a second side comprising a substantially smooth surface;
wherein said second side comprises an anti-reflective surface;
wherein the first side of the lenticular screen is positioned to face the display screen; and
wherein the second side of lenticular screen is positioned to face an observer of the display screen.

52. The gaming device as defined in claim 37, wherein each of said display pixels comprise a plurality of sub-pixels arranged in a plurality of columns and wherein each of said lenticules are aligned with one of said columns.

* * * * *